US008454438B2

(12) United States Patent
Enokido et al.

(10) Patent No.: US 8,454,438 B2
(45) Date of Patent: Jun. 4, 2013

(54) GAMING MACHINE HAVING TWO IMAGE DISPLAY DEVICES

(75) Inventors: Kenji Enokido, Tokyo (JP); Shintaro Okazawa, Tokyo (JP); Masumi Fujisawa, Tokyo (JP)

(73) Assignees: Universal Entertainment Corporation, Tokyo (JP); Aruze Gaming America, Inc., Las Vegas, NV (US)

( * ) Notice: Subject to any disclaimer, the term of this patent is extended or adjusted under 35 U.S.C. 154(b) by 0 days.

(21) Appl. No.: 13/287,604

(22) Filed: Nov. 2, 2011

(65) Prior Publication Data

US 2012/0108315 A1 May 3, 2012

(30) Foreign Application Priority Data

Nov. 2, 2010 (JP) ................................ 2010-246857

(51) Int. Cl.

*A63F 9/24* (2006.01)
*A63F 13/00* (2006.01)
*G06F 17/00* (2006.01)
*G06F 19/00* (2006.01)

(52) U.S. Cl.

USPC .................... 463/31; 463/16; 463/20; 463/22

(58) Field of Classification Search

USPC .............................. 463/16–20, 25, 22, 29–31

See application file for complete search history.

(56) References Cited

U.S. PATENT DOCUMENTS

| | | | | |
|---|---|---|---|---|
| 6,254,481 | B1 * | 7/2001 | Jaffe | 463/20 |
| 6,315,660 | B1 * | 11/2001 | DeMar et al. | 463/16 |
| 7,713,119 | B2 * | 5/2010 | Pacey et al. | 463/20 |
| 2003/0157978 | A1 * | 8/2003 | Englman | 463/16 |
| 2003/0199307 | A1 * | 10/2003 | DeMar et al. | 463/20 |
| 2007/0259706 | A1 * | 11/2007 | Anderson et al. | 463/16 |
| 2009/0118001 | A1 * | 5/2009 | Kelly et al. | 463/29 |
| 2009/0124348 | A1 * | 5/2009 | Yoseloff et al. | 463/22 |

FOREIGN PATENT DOCUMENTS

| | | | |
|---|---|---|---|
| EP | 1 376 498 | A1 | 1/2004 |
| JP | 2008-220608 | | 9/2008 |

* cited by examiner

*Primary Examiner* — Milap Shah

(74) *Attorney, Agent, or Firm* — Lexyoume IP Meister, PLLC.

(57) ABSTRACT

A gaming machine is provided which is capable of causing a player's eye to smoothly move from a main game to a rendering when the rendering is started.

When a predetermined number or more of predetermined symbols are displayed on a first display as a result of a first game, a first control signal for displaying on the first display a dice image in a mode of rolling of the dice for determining progress of a second game that is different from the first game is output from a controller to the first display, as triggered by detection of an operation of an operating device by a player. After a first predetermined period of time has elapsed after output of the first control signal has been started, a second control signal for display control to display a dice image in a dice rolling mode on the second display is output from the controller to the second display.

16 Claims, 23 Drawing Sheets

(b)

(a)

FIG. 5

| | First video reel | Second video reel | Third video reel | Fourth video reel | Fifth video reel |
|---|---|---|---|---|---|
| Code number | Symbol | Symbol | Symbol | Symbol | Symbol |
| 00 | JACKPOT 7 | JACKPOT 7 | JACKPOT 7 | JACKPOT 7 | JACKPOT 7 |
| 01 | PLUM | BELL | CHERRY | ORANGE | APPLE |
| 02 | ORANGE | APPLE | ORANGE | PLUM | ORANGE |
| 03 | PLUM | BELL | APPLE | STRAWBERRY | BELL |
| 04 | ORANGE | CHERRY | ORANGE | BELL | PLUM |
| 05 | PLUM | ORANGE | PLUM | PLUM | BLUE 7 |
| 06 | ORANGE | PLUM | ORANGE | APPLE | ORANGE |
| 07 | PLUM | CHERRY | PLUM | BLUE 7 | APPLE |
| 08 | BLUE 7 | BELL | ORANGE | PLUM | PLUM |
| 09 | CHERRY | APPLE | PLUM | ORANGE | BELL |
| 10 | ORANGE | BELL | ORANGE | BELL | CHERRY |
| 11 | BELL | STRAWBERRY | PLUM | ORANGE | PLUM |
| 12 | ORANGE | PLUM | BELL | PLUM | BELL |
| 13 | STRAWBERRY | BLUE 7 | STRAWBERRY | CHERRY | ORANGE |
| 14 | BLUE 7 | BELL | BLUE 7 | APPLE | APPLE |
| 15 | ORANGE | APPLE | BELL | STRAWBERRY | PLUM |
| 16 | APPLE | BELL | CHERRY | CHERRY | CHERRY |
| 17 | PLUM | STRAWBERRY | PLUM | BELL | ORANGE |
| 18 | ORANGE | PLUM | ORANGE | PLUM | BELL |
| 19 | PLUM | CHERRY | PLUM | ORANGE | ORANGE |
| 20 | BLUE 7 | BELL | ORANGE | CHERRY | PLUM |
| 21 | CHERRY | APPLE | PLUM | PLUM | STRAWBERRY |

FIG. 7

Symbol combination table

| Combination of symbols | | | | | Number of payouts | Winning combination |
|---|---|---|---|---|---|---|
| First video reel | Second video reel | Third video reel | Fourth video reel | Fifth video reel | | |
| JACKPOT 7 | JACKPOT 7 | JACKPOT 7 | JACKPOT 7 | JACKPOT 7 | Amount of jackpot | Jackpot |
| APPLE | APPLE | APPLE | APPLE | APPLE | Bonus game※ | Bonus game trigger |
| BLUE 7 | BLUE 7 | BLUE 7 | BLUE 7 | BLUE 7 | 10 | BLUE |
| BELL | BELL | BELL | BELL | BELL | 8 | BELL |
| CHERRY | CHERRY | CHERRY | CHERRY | CHERRY | 5 | CHERRY 3 |
| STRAWBERRY | STRAWBERRY | STRAWBERRY | STRAWBERRY | STRAWBERRY | 5 | STRAWBERRY |
| PLUM | PLUM | PLUM | PLUM | PLUM | 4 | PLUM |
| ORANGE | ORANGE | ORANGE | ORANGE | ORANGE | 3 | ORANGE 3 |
| CHERRY | CHERRY | CHERRY | (ANY) | (ANY) | 2 | CHERRY 2 |
| ORANGE | ORANGE | ORANGE | (ANY) | (ANY) | 2 | ORANGE 2 |
| CHERRY | (ANY) | (ANY) | (ANY) | (ANY) | 1 | CHERRY 1 |
| ORANGE | (ANY) | (ANY) | (ANY) | (ANY) | 1 | ORANGE 1 |

※Free games of the number of times determined by lottery are conducted.

FIG. 20
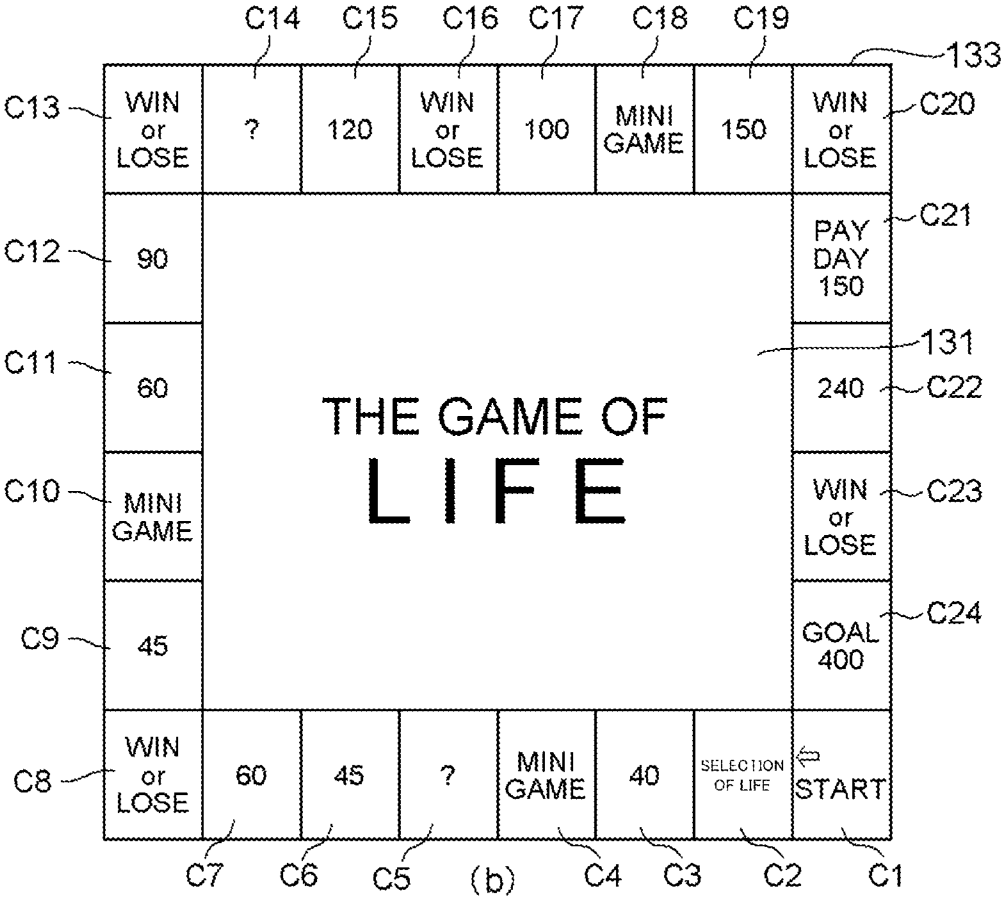
(b)
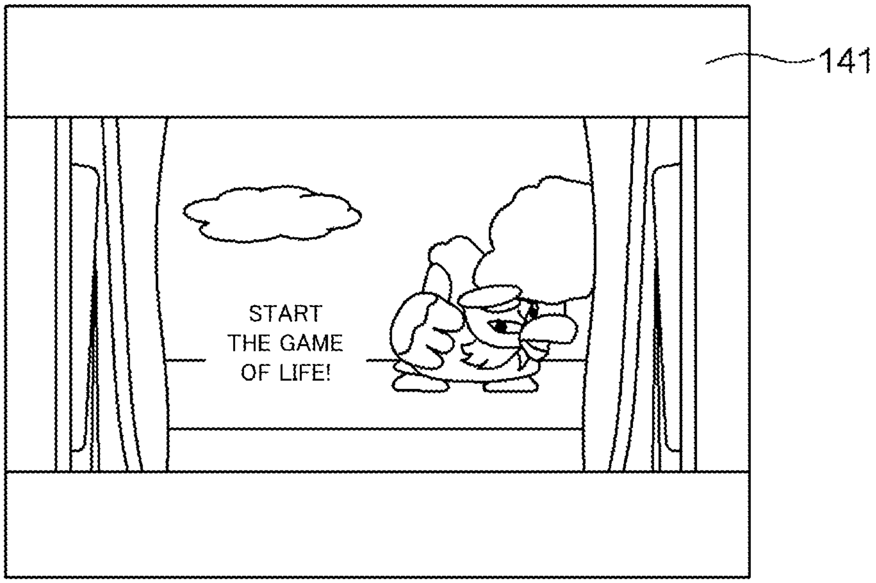
(a)

FIG. 21
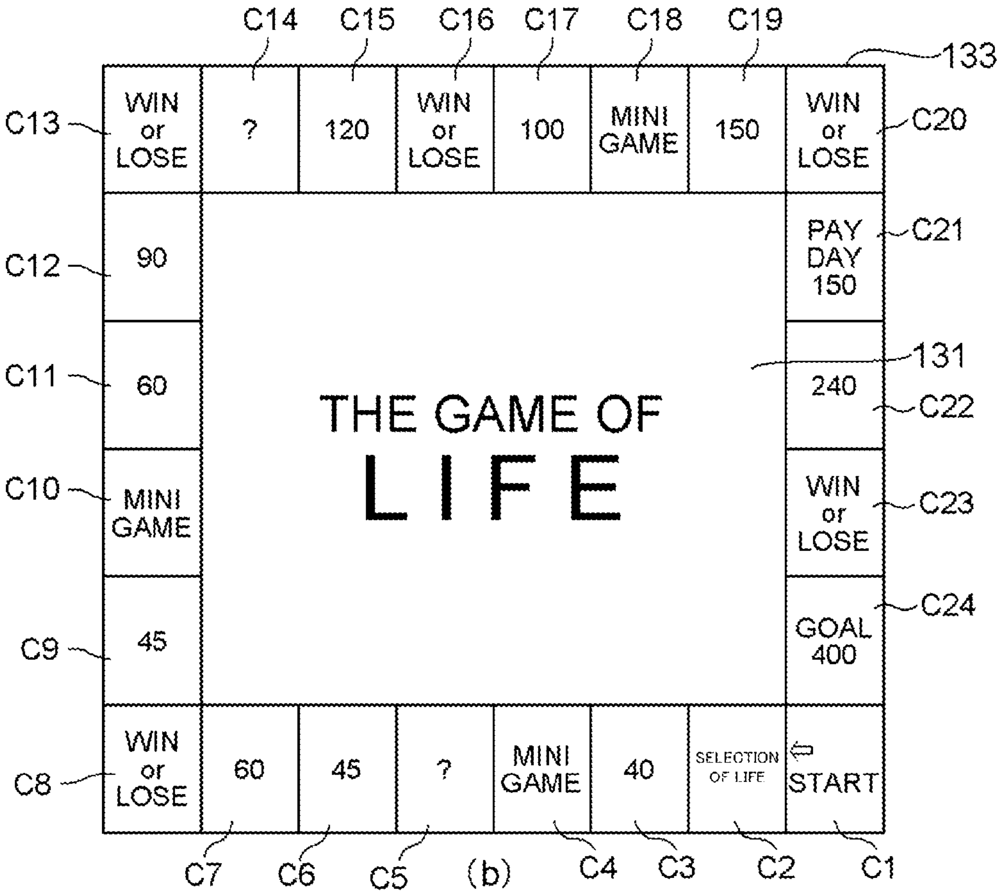
(b)
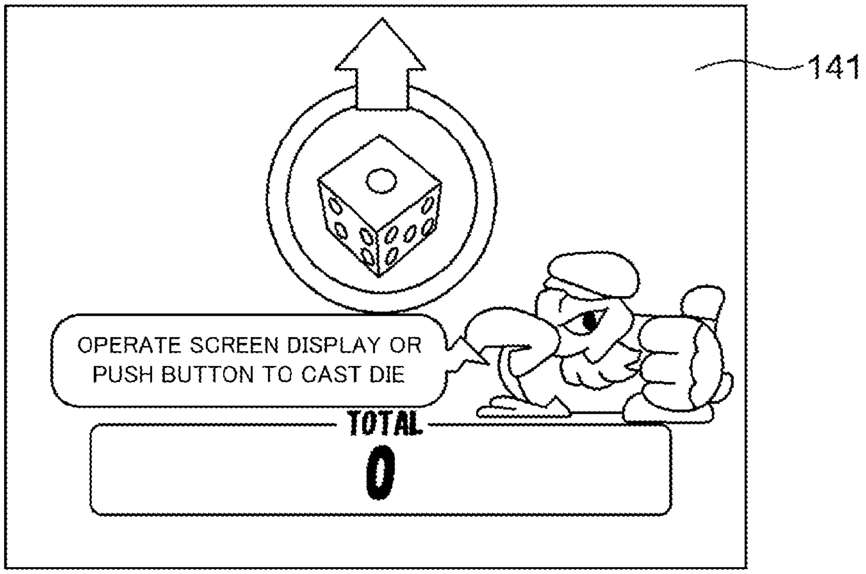
(a)

FIG. 22
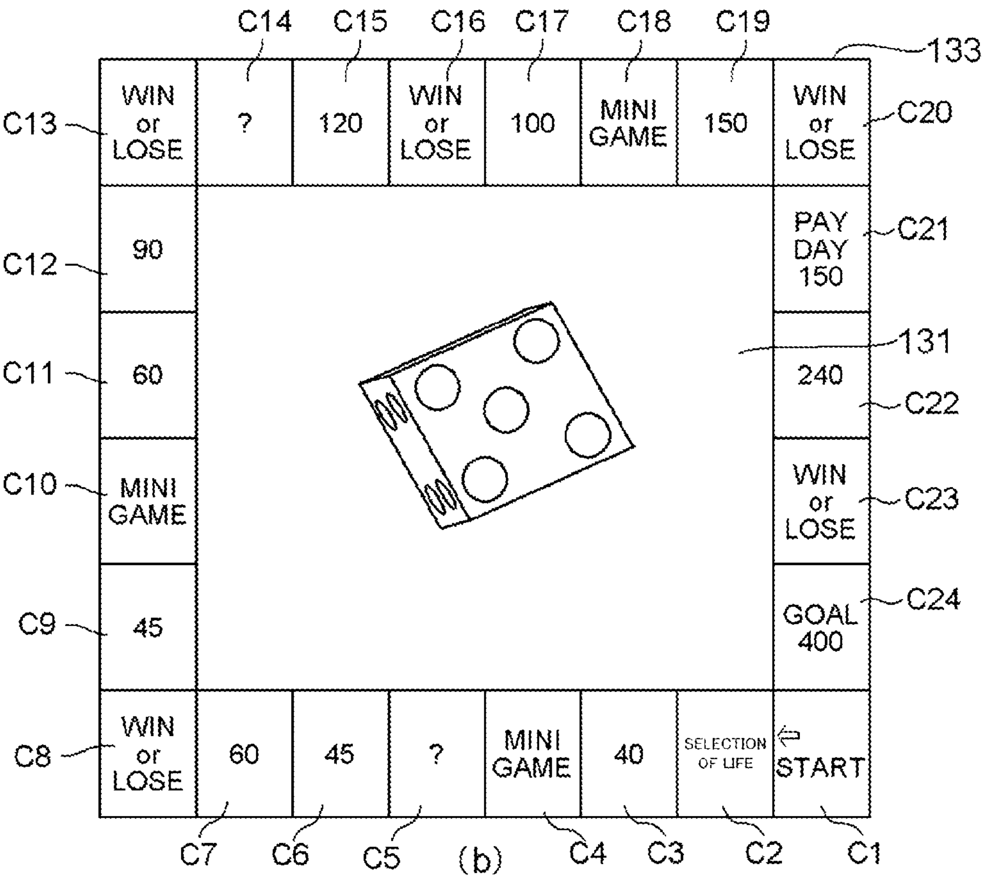
(b)
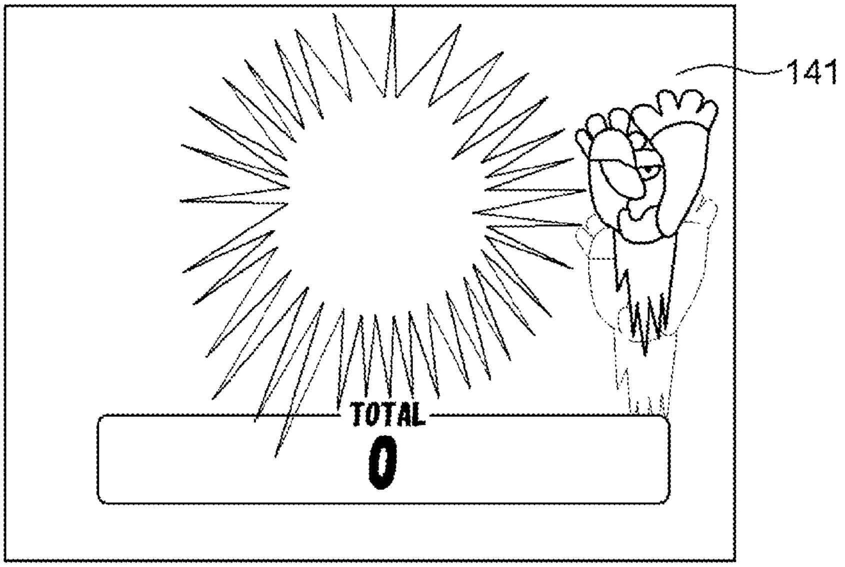
(a)

GAMING MACHINE HAVING TWO IMAGE DISPLAY DEVICES

CROSS REFERENCE TO RELATED APPLICATIONS

This application claims priority of Japanese Patent Application No. 2010-246857 filed on Nov. 2, 2010. The contents of this application are incorporated herein by reference in their entirety.

BACKGROUND OF THE INVENTION

1. Field of the Invention

The present invention relates to a gaming machine having two image display devices.

2. Description of the Related Art

Conventionally, in gaming machines, games to be played by means of symbol display have been performed. Specially, a plurality of symbols are displayed in a stopped manner after the symbols have been movably displayed during a predetermined period of time, and according to a combination of the plurality of symbols having displayed in a stopped manner, a predetermined prize is awarded to a winning player. The winning player repeatedly plays a unit game from movably display to display of the symbols in a stopped manner while expecting that such a prize will be obtained.

In the conventional gaming machines, in addition to the game played by such symbol display, a variety of rendering for attracting a player's interest have been performed. Among them, for example, there has been a gaming machine in which a main display device and a plurality of subsidiary display devices that are smaller in comparison with the main display device are provided. The plurality of subsidiary, display devices have been disposed to be distributed at a plurality of sites on a front face of a gaming machine. In other words, there has been a gaming machine in which a subsidiary control board is connected to each of the plurality of subsidiary display devices, a variety of image data that is stored in advance in a ROM or the like is read out under the control of a CPU of each of the subsidiary control board, and a variety of images can be displayed on each of the plurality of subsidiary display devices (for example, refer to Japanese Unexamined Patent Application Publication No. 2008-220608).

Further, there has also been a gaming machine in which a subsidiary display device that is independent of a main display device is provided, and on the main display device, a game to be played by displaying symbols is performed, and a roulette game is performed on the subsidiary display device (for example, refer to European Patent Application Publication No. 1376498).

In the gaming machine described above, in which the main display device and the plurality of subsidiary display devices are provided, the plurality of subsidiary display devices have been disposed to be distributed at a plurality of sites on the front face of the gaming machine. Therefore, there has been a need to allocate spaces for disposing the plurality of subsidiary display devices on the front face or in the rear direction of the gaming machine. The plurality of subsidiary display devices are thus provided to be distributed from each other, and therefore, a player needs to see all of the subsidiary display devices in order to obtain desired items of information, and has been forced to significantly move his or her eye while playing a game. Accordingly, there has been a high possibility that the player fails to check out images that are displayed on the subsidiary display device and cannot recognize important information relating to a game.

In addition, there has been provided a subsidiary control board for individually controlling each of the plurality of subsidiary display devices described above; and therefore, a variety of rendering images can be displayed on each of the plurality of subsidiary display devices. However, there has also been a need to allocate spaces for providing these subsidiary control boards inside of the gaming machine. Further, the subsidiary control board has been connected to each of the plurality of subsidiary display devices; and therefore, an overall configuration of the gaming machines becomes complicated and there is a need to perform processing for synchronizing a screen to be displayed on each of the plurality of subsidiary display devices. In addition to the above configuration, processing to be executed on the subsidiary control board has also been forced to be complicated and cumbersome.

Further, in a gaming machine configured to play a roulette game on a subsidiary display device, a rendering that is exerted by the roulette game has been made with the use of the entirety on the front side of the subsidiary display device. While a roulette board can be increased and can be easily visually recognized, a region on the front face of the subsidiary display device has not been effectively utilized. Furthermore, there is provided a mechanism for mechanically driving a roulette game board; and therefore, there are a very small number of variations and the contents of the rendering is likely to be monotonous. Moreover, there is a high possibility that a failure occurs, and cumbersomeness or costs of maintenance or the like has been required.

The present invention has been made in view of the circumstance described above, and it is an object of the present invention to provide a gaming machine that is capable of causing a player to smoothly move his or her eyes from a main game to rendering when the rendering is started; that is capable of allocating a space for disposing a display device employed for the sake of rendering without having an effect on a display device for performing a main game; and that is capable of effectively utilizing the allocated space.

SUMMARY OF THE INVENTION

A gaming machine according to an embodiment of the present invention including:

a first display on which a first game whose result is determined according to a symbol display mode is to be performed;

a second display that is different from the first display;

an operating device configured to detect a player operation; and a controller for controlling the first display and the second display, the controller being programmed so as to execute processing operations of:

(1-1-1) when a predetermined number or more of predetermined symbols are displayed on the first display as a result of the first game, outputting from the controller to the first display a first control signal for displaying on the first display a dice image as triggered by detection of an operation of the operating device by a player in a mode of rolling of a dice for determining progress of a second game that is different from the first game;

(1-1-2) after a first predetermined period of time has elapsed after starting output of the first control signal, outputting from the controller to the second display a second control signal for display control to display a dice image on the second display in a dice rolling mode; and (1-1-3) completing output of the first control signal after a second predetermined period of time that is different from the first predetermined period of time has elapsed after starting output of the first control signal.

A dice image is moved after a first game has completed, whereby a player can move his or her eye from a first display to a second display, naturally allowing the payer to have his or her interest in a second game to be played on the second display device. A configuration having the first display and the second display is provided, the configuration being controlled by means of a first control signal and a second control signal; and therefore, a rendering can be executed by means of a simple configuration and processing operations. The player's eye can be naturally moved to the second display, thus enabling the player to visually recognize the second game. The first display and the second display are controlled by means of a controller to thus able to eliminate cumbersomeness or costs of maintenance.

Further, in an aspect of the present invention, wherein the controller is configured to further execute processing operations of:

(1-2-1) determining a rolled number of a dice by means of lottery processing, and (1-2-2) after executing the processing operation of (1-1-2), displaying an image of the dice to be stopped so that the rolled number of the dice that is determined by means of the lottery processing is displayed by means of the second control signal.

A rolled number of a dice determining the progress of a second game played on the second display are displayed to thus able to attract the player's interest.

Furthermore, in the aspect of the present invention, wherein the controller is configured to further execute a processing operation of (1-3-1) executing as the second game a game to be played by selecting one cell from among a plurality of cells in accordance with the rolled number of the dice that is determined by means of the lottery processing after executing the processing operation of (1-2-2).

A cell is selected and moves in accordance with the roiled numbers of dice to thus able to impart a tense atmosphere or a sense of expectation to a player with respect to the progress of a game.

In addition, in the aspect of the present invention, wherein the controller is configured to further execute a processing operation of (1-4-1) executing a processing operation of storing a predetermined prize for a selected cell as a profit to be awarded to a player after executing the processing operation of (1-3-1).

A prize to be awarded to a player is determined in accordance with a cell that is selected according to the rolled numbers of dice to thus able to impart a tense atmosphere or a sense of expectation to a player with respect to a cell to be selected in the second game.

Further, in the aspect of the present invention, wherein the controller is configured to further execute processing operations of when a goal cell included in the plurality of cells has not reached after executing the processing operation of (1-3-1), (1-5-1) outputting from the controller to the first display a first control signal for displaying on the first display a dice image in a mode of rolling of the dice, as triggered by detection of an operation of the operating device by a player;

(1-5-2) executing the processing operations of (1-1-2) and (1-1-3); and (1-5-3) executing the processing operations of (1-2-1) and (1-2-2).

The second game can be continued until a goal cell has been reached to be thus able to sustain a sense of expectation imparted to a player.

Furthermore, in the aspect of the present invention, wherein the plurality of cells are disposed at a part of at least a periphery of the second display, and the controller is configured to execute a processing operation of (2-6-1) displaying an indicator image indicating one selected cell on the second display.

A plurality of cells are provided at least at a part of the periphery of a second display so as to be able to perform a game, so that a space that can be a dead space of the second display can be effectively utilized. Even in a case where a lamp breaks or is not used for a long time, an indicator image is displayed on the second display to thus able to indicate one selected cell, enabling a player to clearly visually recognize the progress of a game.

In addition, the player is allowed to clearly visually recognize the selected cell by changing an illumination state of a lamp of the cell that is selected according to rolled numbers of dice determined by means of lottery processing and a rendering image corresponding to the contents of the selected cell is displayed on the second display to this able to enhance a rendering effect exerted by the second display and the cell that is disposed at least at a part of the periphery of the second display.

Further, in the aspect of the present invention, wherein the controller is configured to further execute a processing operation of (2-7-1) displaying a rendering image that corresponds to one selected cell on the second display in addition to the processing operation of (2-6-1).

One selected cell can be indicated by means of not only illumination but also an image that is displayed on a second display as well, the selected cell is clearly visually recognized by a player by effectively utilizing a display area, enabling a player to clearly identify the process of a second game and enhance a rendering effect.

Furthermore, in the aspect of the present invention, wherein the controller is configured to further execute processing operations of:

(3-8-1) when a goal cell has been selected from among the plurality of cells, selecting one option from among a plurality of options in accordance with an operation of the operating device by a player; and (3-8-2) changing a predetermined prize for the goal cell in accordance with said one option that is selected by the player.

When a goal cell has been selected, a selection game is further executed to thus able to enhance or sustain a sense of expectation of a player.

Furthermore, in the aspect of the present invention, wherein the processing operation of (3-8-2) is a processing operation of, when a first option has been selected from among a plurality of options, determining a prize that is more than a predetermined prize for the goal cell as a profit to be awarded to a player, or alternatively, when a second option that is different from the first option has been selected from among the plurality of options, determining the predetermined prize for the goal cell as a profit to be awarded to a player.

When a first option has been selected, a more prize than a predetermined prize is awarded, or alternatively, when a second option has been selected, the predetermined prize is awarded. Thus, even in the case where the second option has been selected, at least the predetermined prize is awarded, and a minimum prize to be awarded when a goal cell has been selected is allocated, and a player can enjoy a selection game at ease.

When rendering is started, a player is allowed to smoothly move his or her eye from a main game to rendering.

BRIEF DESCRIPTION OF THE DRAWINGS

FIG. 5 is a view showing a symbol table for normal game;

FIG. 7 is a table showing symbol combinations of the gaming machine according to the embodiment of the present invention;

FIG. 20 is a view showing an image (a) that is displayed on a lower image display panel 141 and an image (b) that is displayed on an upper image display panel 131 when a game of life (a second game) has been started;

FIG. 21 is a view showing when a dice image has been displayed on the lower image display panel 141;

FIG. 22 is a front view showing a dice image when a dice rolls from the lower image display panel 141 to the upper image display panel 131.

DESCRIPTION OF THE PREFERRED EMBODIMENTS

Hereinafter, embodiments of the present invention will be described with reference to the drawings.

<<<<Embodiments of the Present Invention>>>>

An overview of the gaming machine according to an embodiment of the present invention is described below. If three or more bonus symbols stop in a first game, a dice game or a game of life is started as a second game. A dice displayed on a first display on which the first game is performed is touched, whereby a dice rolls onto a second display.

A hardware configuration assumes that: (1) image data of a dice common to the first display and the second display is employed; (2) a control program for obtaining synchronization between the first display and the second display exists; and (3) dice movement is executed by means of a command input from a player. With such a configuration, trigger of dice movement is operated by the player to thus able to induce the player to move to his or her eye to the second display. In general, a game using a dice is executed on the second display, and an increase of prize money (prize) is displayed on the first display. A setup condition in the vertical direction or in the horizontal direction of the gaming machine is determined depending on the size of the first display or the second display, thus limiting an area of a display region on the first display or the second display. However, a gaming machine can be provided which is capable of effectively utilizing display areas of the two screens that are made of the first display and the second display by displaying an image of moving a dice.

Figure 1:
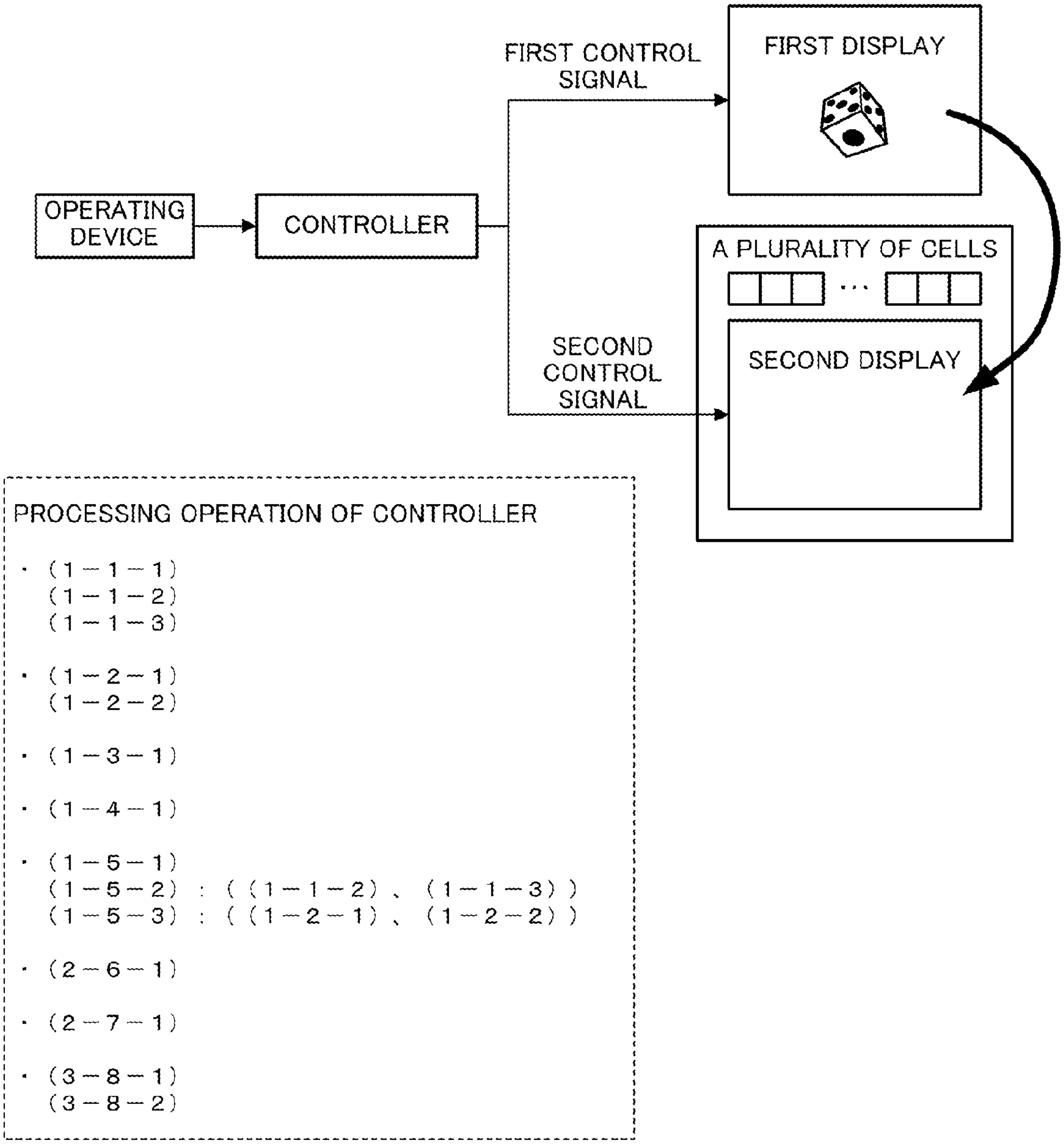
FIG. 1 is a view schematically depicting a configuration of a gaming machine according to an embodiment of the present invention.

FIG. 1 shows an overview of the gaming machine according to the embodiment of the present invention. The gaming machine according to the embodiment of the present invention has: a first display (for example, a lower image display panel 141 or the like to be described later) on which a first game (for example, a slot game or the like) whose result is determined according to a symbol display mode is to be performed; a second display (for example, an upper image display panel 131 or the like to be described later) that is different from the first display; an operating device configured to detect a player operation (for example, a touch panel 114 or a spin button 31 or the like to be described later); and a controller for controlling the first display and the second display, the controller being programmed to execute processing operations of: (1-1-1) when a predetermined number or more of predetermined symbols are displayed on the first display as a result of the first game, outputting from the controller to the first display a first control signal for displaying a dice image on the first display in a mode of rolling a dice for determining a second game (for example, a dice game or a game of life) that is different from the first game as triggered by detection of an operation of the operating device by a player (for example, step S1621 or the like to be described later); (1-1-2) after a first predetermined period of time has elapsed after output of the first control signal has been started, outputting from the controller to the second display a second control signal for display control of displaying on the second display a dice image in a dice rolling mode (for example, step S1621 or the like to be described later); and (1-1-3) outputting output of the first control signal after elapse of a second predetermined period of time that is different from the first predetermined period of time after starting output of the first control signal (for example, step S1621 or the like to be described later).

The gaming machine according to the embodiment of the present invention has: a first display and a second display; an operating device; and a controller.

The first display is a display on which a first game is to be performed. A result of the first game is determined according to a symbol display mode. For example, the first game includes a slot game or the like. The second display is a display that is different from the first display.

The operating device is a device that can be operated by a player and detects a player operation. When the player operation has been selected, a detection signal is issued to a controller.

The controller is configured to control the first display and the second display. The first display is controlled by means of a first control signal to be described later. The second display is controlled by means of a second control signal to be controlled later.

The controller is programmed to execute processing operations (1-1-1) to (1-1-3) to be described later.

The processing operation (1-1-1) is a processing operation of outputting a first control signal from the controller to the first display. The first control signal is a control signal for displaying an image in a dice rolling mode on the first display. A dice is displayed to determine the progress of a second game that is different from a first game. The first control signal is output as triggered by the fact that a predetermined number or more of predetermined symbols are displayed on the first display as a result of the first game and further an operation of the operating device by a player is detected.

The processing operation (1-1-2) is a processing operation of outputting a second control signal from the controller to the second display. The second control signal is a control signal for displaying an image in a dice rolling mode on the second display. The second control signal is output after a first predetermined period of time has elapsed after output of the first control signal has been started.

The processing operation (1-1-3) is a processing operation of completing output of the first control signal. The output of the first control signal completes after a predetermined second period of time has elapsed after output of the first control signal has been started.

In a case where the second predetermined period of time is longer than the first predetermined period of time, it includes a period of time during which a dice image is displayed in an overlapping manner on each of the first display and the second display. For example, a lower portion of a dice is displayed on the first display, whereas the remaining portion of the dice is displayed on the second display. By displaying the dice in this manner, an appearance of dice rolling can be smoothly displayed.

On the other hand, in a case where the second predetermined period of time is longer than the first predetermined period of time, a dice image on the first display is displayed as if it were disappearing and then the dice image having disappeared therefrom is suddenly appearing on the second display. There exists a non-display time indicating that no dice image is displayed on the first display or the second display, thus enabling a player to have a tense atmosphere.

A dice image is moved after the first game has completed, whereby a player can move his or her eye smoothly from the first display to the second display, to be able to naturally have his or her interest in the second game to be played on the second display. Since there is provided a configuration having the first display and the second display, the configuration being controlled by means of a first control signal and a second control signal, rendering can be executed by means of a simple configuration and processing operations. The player's eye can be naturally moved to the second display, thus enabling the player to visually recognize the second game. The first display and the second display are controlled by means of a controller to thus able to eliminate cumbersomeness or costs of maintenance. In addition, a dice is displayed in a roiling mode to thereby able to associate an image that is displayed on the first display with an image that is displayed on the second display and enhance a rendering effect.

In addition, the controller is configured to further execute processing operations of: (1-2-1) determining a rolled number of a dice by means of lottery processing (for example, step S1619 or the like to be described later); and (1-2-2) after executing the processing operation (1-1-2), displaying an image of the dice to be stopped so that the rolled number of the dice that is determined by the lottery processing is displayed by means of the second control signal (for example, step S1623 or the like to be described later).

The second control signal is a control signal to execute a processing operation of displaying a dice image to be stopped so that the rolled number of the dice that is determined by means of lottery processing is displayed after executing the processing operation (1-1-2) described above.

A result of the lottery processing (1-2-1) may be determined before the processing operation (1-2-2) is executed.

The rolled number of the dice determining the progress of a second game to be played on the second display is displayed to thus able to attract a player's interest.

It is preferable that in (1-3-1) the controller be configured to further execute a processing operation (for example, step S1629 or the like to be described later) of executing as the second game a game to be played by selecting one cell from among a plurality of cells in accordance with the rolled number of the dice that is determined by means of the lottery processing after executing the processing operation (1-2-2) described previously.

The processing operation (1-3-1) is a processing operation of selecting one cell from among a plurality of cells in accordance with a rolled number of a dice that is determined by means of lottery processing. The second game is a game in which the progress of a game is determined according to one selected cell. The second game includes a dice game, for example.

It is preferable that with respect to a plurality of cells the adjacent cells be coupled with each other so that a predetermined route is formed, and a game is played in such a manner that one cell is selected along the predetermined route. The predetermined route may be a route that branches or joins partway as well as a single route.

A cell is selected and moves in accordance with the rolled numbers of dice to thus able to impart a tense atmosphere or a sense of expectation to a player with respect to the progress of a game.

It is preferable that the controller be configured to further execute a processing operation (for example, step S1813 or the like to be described later) of (1-4-1) storing a predetermined prize for a selected cell as a profit to be awarded to a player after executing the processing (1-3-1) described previously.

One cell is selected from among a plurality of cells by means of the processing operation (1-3-1) described above, and further, a predetermined prize for the cell that has been selected by means of the processing operation (1-4-1) is awarded to a player. Such a second game includes a game such as a game of life, for example.

A prize to be awarded to a player is determined depending on the cell that has been selected according to a rolled number of a dice to be thus able to impart a tense atmosphere or a sense of expectation to a player with respect to the cell to be selected in the second game.

It is preferable that, the controller be configured to further execute processing operations of, after executing the processing operation (1-3-1) described previously, when a goal cell included in the plurality of cells is not reached, (1-5-1) outputting from the controller to the first display a first control signal for displaying on the first display a dice image in a mode in which the dice rolls, as triggered by detection of an operation of the operating device by a player (for example, step S1621 or the like to be described later); (1-5-2) executing the processing operations (1-1-2) and (1-1-3) described previously; and (1-5-3) executing the processing operations (1-2-1) and (1-2-2) described previously.

A plurality of cells can include a goal cell serving as a goal point of the second game. That is, the second game is a game to be played in such a manner that a predetermined cell is advanced to goal cell as a start point. The second game may be a game in which a piece reverts to a previous cell partway or temporarily stops in one cell, or alternatively, the game completes partway as well as the case in which the predetermined cell is advanced to the goal cell as a start point.

In a case where the goal cell is not selected and is not reached, the second game is continued by executing the processing operations (1-5-1) to (1-5-3). The processing operations (1-1-2), (1-1-3), (1-2-1), and (1-2-2) can be repeatedly executed by executing the processing operations (1-5-1) to (1-5-3).

The second game can be continued until the goal cell has been reached, to be able to sustain a sense of expectation imparted to a player.

In addition, a rendering lamp for game frame (cell) such as a dice game is disposed on an outer periphery of the second display, and rendering or the like is performed at a center portion of the second display together with indication of the frame position in game. By effectively utilizing a display area, it is possible for a player to easily identify the progress of a game and to enhance a rendering effect.

For example, it is preferable that the plurality of cells be disposed at least at a part of the periphery of the second display and that in (2-6-1) the controller be configured to execute a processing operation of displaying an indicator image indicating one selected cell on the second display (for example, step S1627 or the like to be described later).

A plurality of cells are disposed at least at a part of at least the periphery of the second display. For example, a plurality of cells are disposed so as to circumferentially surround an outer periphery of the second display.

The processing operation (2-6-1) is a processing operation of displaying on the second display an indicator image indicating one of the cells that are disposed at least at the periphery of the second display. The indicator images indicating cells include an arrow-pointing image indicating a cell by means of the arrow. By doing this, it is possible to cause a player to visually recognize that one cell has been selected using the second display. That is, even in a case where a back lamp is provided at a back of a cell, it is possible to eliminate a configuration or control operation such that a cell is indicated by changing brightness of the back lamp.

For example, the following configuration and control are required to show a player one cell that is selected so as to change the brightness of the back lamp. For example, a barrier plate for interrupting light is provided at a boundary between the adjacent cells, and a plurality of cells are partitioned by means of this barrier plate. In addition, a plurality of lamps are provided at the rear of each of the plurality of cells to be associated with each of the plurality of cells. Further, the plurality of lamps are connected to the controller, and an illumination state of each of the plurality of lamps is individually controlled by means of the controller. By doing this, the illumination state of the lamp that corresponds to one selected cell is changed. For example, the lamp is changed from a non-illumination state to an illumination state. By changing the illumination state, it is possible for a player to visually recognize one selected cell.

However, by means of the processing operation (2-6-1) described above, the indicator image indicating one cell is displayed on the second display to be thereby able to eliminate a barrier plate for preventing light from leaking by partitioning a plurality of cells or a plurality of lamps associated with a plurality of cells. In addition, since there is no need to change the illumination state of the lamp, it is possible to eliminate a light emission control program for performing light emission control by means of the controller as well.

In addition, as described above, even in a case where one cell selected so as to change brightness of a back lamp is indicated for a player, even if a service life of the back lamp expires, if a back lamp cannot be used owing to a setup environment of a gaming machine, or if a player removes a back lamp for a reason why the back lamp makes the player dizzy, the indicator image is displayed on the second display so that one selected cell can be shown for the player. In this manner, the gaming machine can be operated without affected by a failure, an environment, or a player's preference or the like, and operability of the gaming machine can be maintained.

In order to show a player one cell selected so as to change brightness of a back lamp, it is preferable that a gaming machine be configured to have a plurality of lamps associated with a plurality of cells, which are disposed at least at a part of the periphery of the second display and are partitioned by a barrier, each of the lamps being configured to illuminate each of the plurality of cells, and that the controller be configured to execute a processing operation of changing an illumination state of a lamp that is corresponds to one selected cell.

That is, a plurality of cells are disposed at least a part of the periphery of the second display. Further, the plurality of cells are partitioned by means of a barrier. Each of the plurality of lamps is associated with each of the plurality of cells. For example, the plurality of lamps are provided so that a first lamp corresponds to a first cell and an n-th lamp corresponds to an n-th cell. Each of the plurality of lamps is configured to illuminate each of the plurality of cells. Therefore, the first cell is illuminated by means of the first lamp, and the n-th cell is illuminated by means of the n-th lamp.

Further, the illumination state of the lamp that corresponds to one selected cell is changed under the control of the controller. The change of the illumination state may be the one that a player can visually recognize one selected cell. For example, it may be that the non-illumination is changed to the illumination state, the illumination state is changed to the non-illumination state, or an illumination state with its predetermined brightness is changed to a brighter illumination state.

In such a case, a cell selected according to a rolled number of a dice determined by means of lottery processing is illuminated by means of a lamp, whereby the selected cell can be clearly visually recognized by a player and a rendering image corresponding to the contents of the selected cell is displayed on the second display to thus able to enhance a rendering effect exerted by the second display and cells disposed at least at a part of the periphery of the second display.

It is preferable that, in addition to the processing (2-6-1) described previously, the controller is configured to further execute a processing operation (for example, step S1627 or the like to be described later) of (2-7-1) displaying a rendering image that corresponds to one selected cell, on the second display.

One selected cell can be suggested not only by an indicator image indicating a cell but by a rendering image that is displayed on the second display as well, and a display area is effectively utilized, whereby the selected cell can be clearly visually recognized by a player, the progress of a second game can be easily identified by the player, and a rendering effect can be enhanced.

Further, the gaming machine according to the embodiment of the present invention executes a game to be played to increase a credit that is acquired in a bonus game (a second game). For example, a two-option roulette game can be performed by utilizing a credit that is acquired in a case where a player has reaches a goal in a game of life (the second game) that is a bonus game.

It is preferable that the controller be configured to further execute a processing operation of (3-8-1) selecting one option from among a plurality of options in accordance with an operation of the operating device by a player when a goal cell has been selected from among the plurality of cells (for example, step S1927 or the like to be described later); and (3-8-2) changing a predetermined prize for the goal cell in accordance with one option that has been selected by the player (for example, step S1939 to be described later).

When the goal cell has been selected, a selection game is further executed to thus able to enhance or sustain a sense of expectation of the player.

Furthermore, it is preferable that the processing operation (3-8-2) described previously be a processing operation of when a first option has been selected from among a plurality of options, determining a prize that is more than the predetermined prize for the goal cell as a profit to be awarded to a player (for example, step S1939 or the like to be described later); and a processing operation of when a second option that is different from the first option has been selected from among a plurality of the options, determining the predetermined prize for the goal cell as a profit to be awarded to a player (for example, step S1943 or the like to be described later).

When the first option has been selected, a prize that is more than the predetermined prize is awarded, or alternatively, when the second option has been selected, the predetermined prize is awarded. Thus, even in the case where the second option has been selected, at least the predetermined prize is awarded, and a minimum prize to be awarded when the goal cell has been selected is allocated, and a player can enjoy a selection game at ease.

<<<<Specific Description of the Embodiments of the Present Invention>>>>

[Explanation of Function Flow Diagram]

Figure 2:
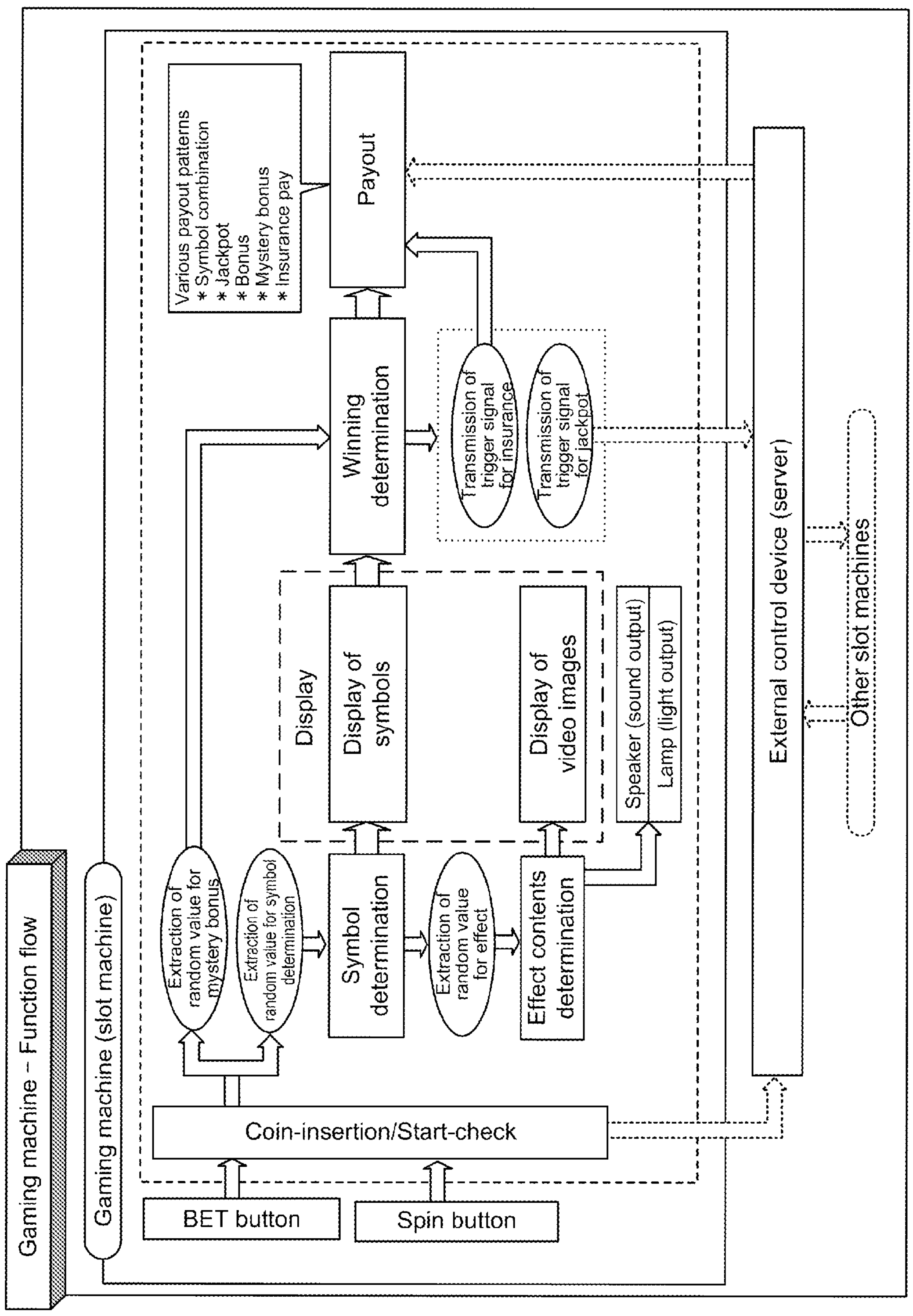
FIG. 2 is a view showing a functional flow diagram of the gaming machine according to the embodiment of the present invention.

With reference to FIG. 2, basic functions of the gaming machine according to the present embodiment are described. FIG. 2 is a view illustrating a function flow of the gaming machine according to the embodiment of the present invention.

<Coin-insertion/Start-check>

First, the gaming machine checks whether or not a BET button has been pressed by the player, and then, subsequently checks whether or not a spin button has been pressed by the player.

<Symbol Determination Processing>

Next, when the spin button has been pressed by the player, the gaming machine extracts random values for symbol determination, and determines symbols to be displayed at the time of stopping scrolling of symbol arrays for the player, for a plurality of respective video reels displayed to a display.

<Symbol Display>

Next, the gaming machine starts scrolling of the symbol array of each of the video reels and then stops scrolling so that the determined symbols are displayed for the player.

<Winning Determination>

When scrolling of the symbol array of each video reel has been stopped, the gaming machine determines whether or not a combination of symbols displayed for the player is a combination related to winning.

<Payout>

When the combination of symbols displayed for the player is a combination related to winning the gaming machine offers benefits according to the combination to the player.

For example, when a combination of symbols related to a payout of coins has been displayed, the gaming machine pays out coins of the number corresponding to the combination of symbols to the player.

Further, when a combination of symbols related to a bonus game trigger has been displayed, the gaming machine starts the bonus game. In the embodiment, a game of life to be played by rolling a dice with a manner that stoppage of three bonus symbols being employed as a bonus game trigger is performed as a bonus game.

When a combination of symbols related to a jackpot trigger is displayed, the gaming machine pays out coins in an amount of jackpot to the player. The jackpot refers to a function which accumulates parts of coins used by players at the respective gaming machines as the amount of jackpot and which, when the jackpot trigger has been established in any of the gaming machines, pays out coins of the accumulated amount of jackpot to that gaming machine.

In each game, the gaming machine calculates the amount (amount for accumulation) to be accumulated to the amount of jackpot and transmits to an external control device. The external control device accumulates to the amount of jackpot the amounts for accumulation transmitted from the respective gaming machines.

Further, in addition to the aforementioned benefits, the gaming machine is provided with benefits such as a mystery bonus and insurance.

The mystery bonus is a bonus in which a predetermined amount of coins are paid out for winning of a lottery that is intended for the mystery bonus. When the spin button has been pressed, the gaming machine extracts a random value for mystery bonus and determines whether or not to establish a mystery bonus by lottery.

The insurance is a function provided for a purpose of relieving the player from a situation in which a free game has not been played for long periods of time. In the present embodiment, the player can arbitrarily select whether or not to make the insurance effective. Making insurance effective requires a predetermined insurance-purchase amount to be paid in exchange.

In the case where the insurance has been made effective, the gaming machine starts counting the number of games. The gaming machine conducts a payout of coins of the amount that is set for the insurance, when the number of counted games has reached a previously determined number of times without a large amount of payout relating to a free game or the like being conducted.

<Determination of Effects>

The gaming machine produces effects by displaying images to the display, outputting the light from lamps, and outputting sounds from speakers. The gaming machine extracts a random value for effect and determines contents of the effects based on the symbols and the like determined by lottery

[Overall Game System]

Figure 3:
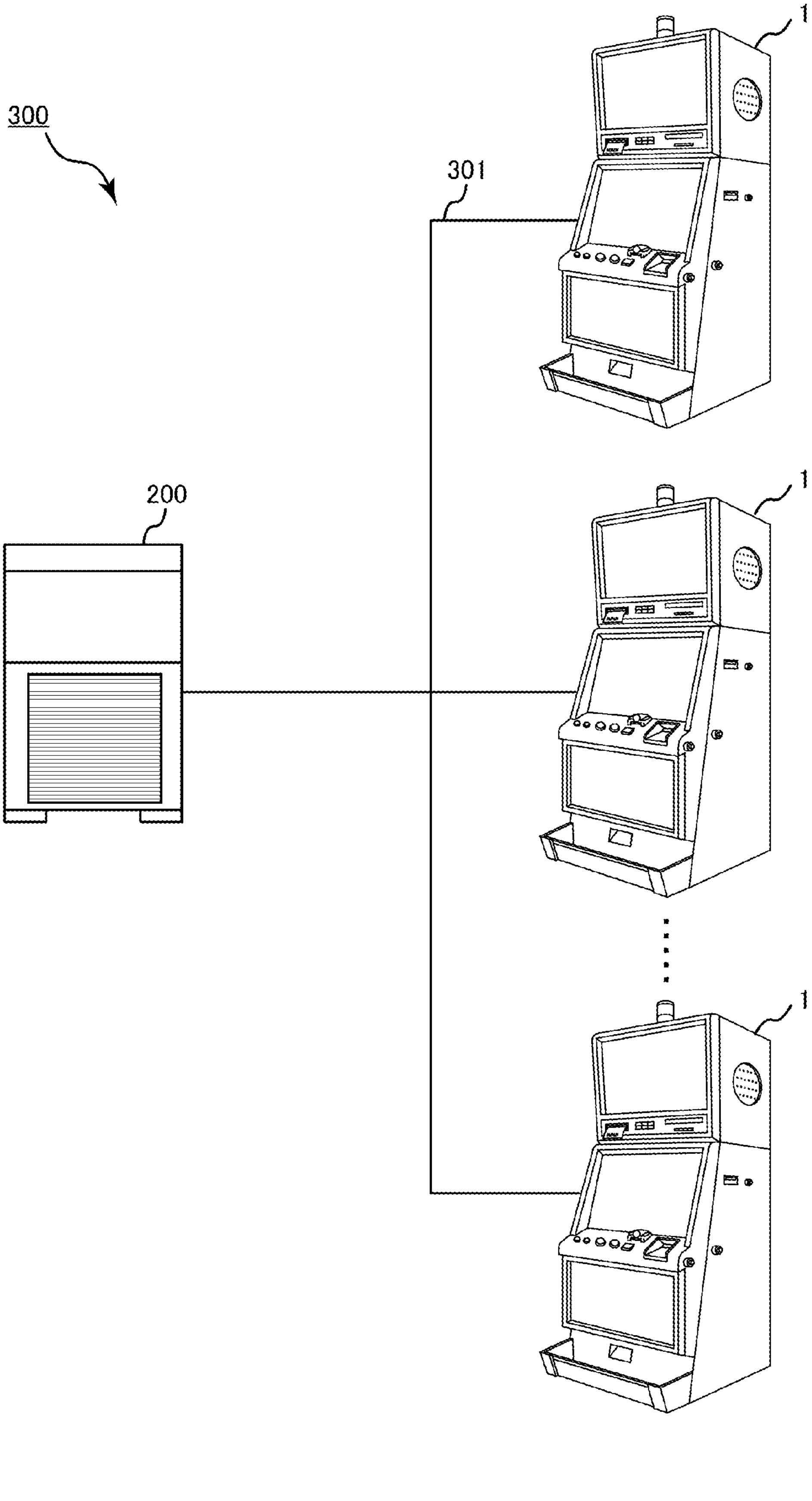
FIG. 3 is a view showing a game system including the gaming machines according to the embodiment of the present invention.

The basic functions of the gaming machine have been described above. Next, with reference to FIG. 3, a game system including the gaining machine is described. FIG. 3 is a view illustrating the game system including the gaming machine according to the embodiment of the present invention.

A game system 300 includes the plurality of gaming machines 1, and an external control device 200 that is connected to each of the gaming machines 1 through a communication line 301.

The external control device 200 is for controlling the plurality of gaming machines 1. In the present embodiment, the external control device 200 is a so-called hall server which is installed in a game facility having the plurality of gaming machines 1. Each of the gaming machines 1 is provided with a unique identification number, and the external control device 200 identifies transmission sources of data transmitted from the respective gaming machines 1 by using the identification numbers. Also in the case where the external control device 200 transmits data to a gaming machine 1, the identification numbers are used for specifying the transmission destination. In addition, the external control device 200 performs accumulation of jackpot, based on the number of gaming mediums that has been betted in each of the gaming machines 1.

It is to be noted that the game system 300 may be constructed within a single game facility where various games can be conducted, such as a casino, or may be constructed among a plurality of game facilities. Further, when the game system 300 is constructed in a single game facility, the game system 300 may be constructed in each floor or section of the game facility. The communication line 301 may be a wired or wireless line, and can adopt a dedicated line, an exchange line or the like.

[Overall Configuration of Gaming Machine]

Figure 4:
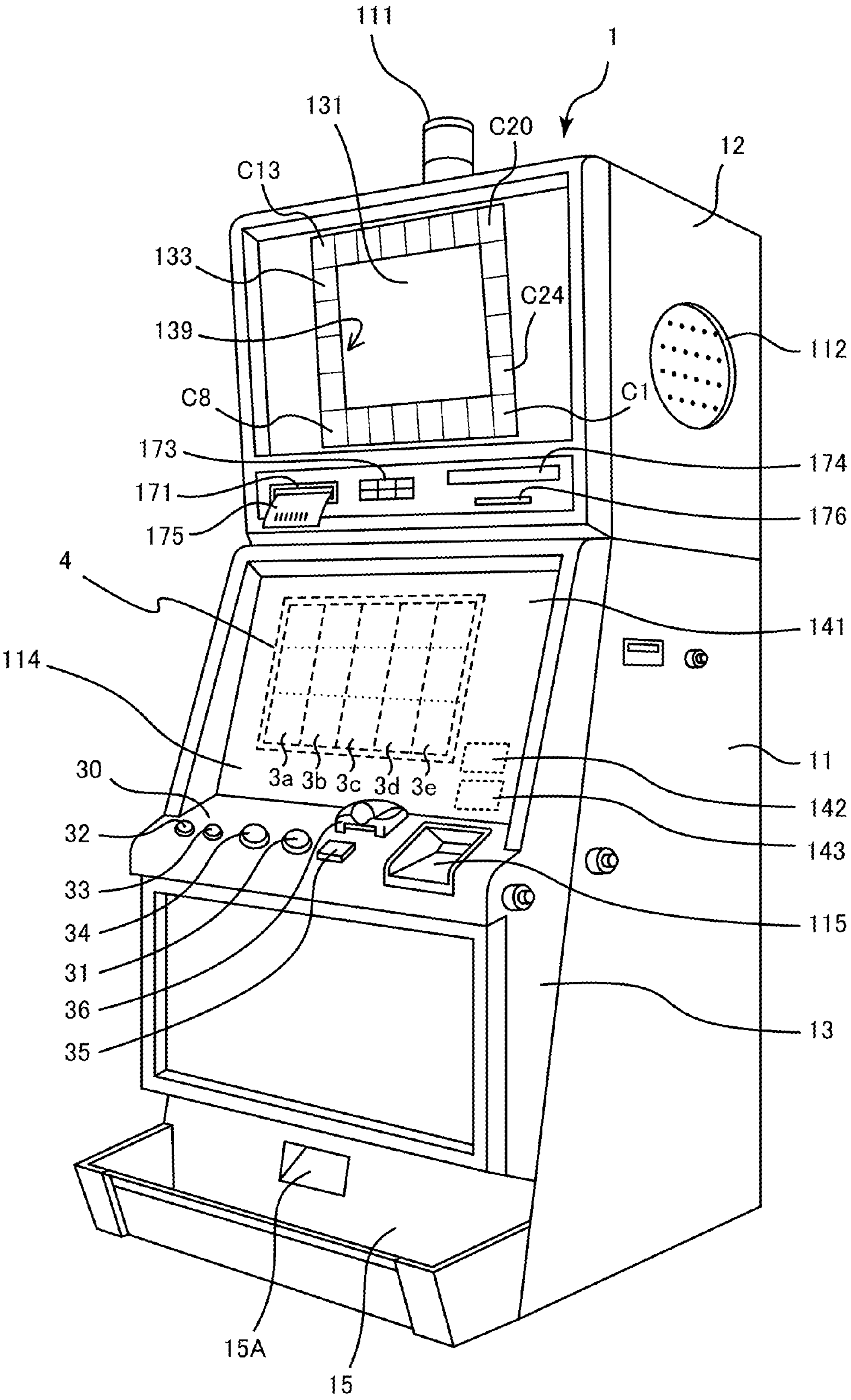
FIG. 4 is a view showing an entire configuration of the gaming machine according to the embodiment of the present invention.

The game system according to the present embodiment has been described above. Next, with reference to FIG. 4, an overall configuration of the gaming machine 1 is described. FIG. 4 is a view illustrating the overall configuration of the gaming machine according to the embodiment of the present invention.

A coin, a bill, or electrically valuable information corresponding to these is used as a game medium in the gaming machine 1. Further, in the present embodiment, a later-described ticket with a barcode is also used. It is to be noted that the game medium is not limited to these, and for example a medal, a token, electric money or the like can be adopted.

The gaming machine 1 includes a cabinet 11, a top box 12 installed on the upper side of the cabinet 11, and a main door 13 provided at the front face of the cabinet 11.

A lower image display panel 141 is provided at the center of the main door 13. The lower image display panel 141 includes a liquid crystal panel, and forms the display. The lower image display panel 141 has a symbol display region 4. To the symbol display region 4, five video reels 3 (3*a*, 3*b*, 3*c*, 3*d*, 3*e*) are displayed. In addition, the symbol display region 4 is provided with 15 display blocks that are indicated by the broken line, and three display blocks are assigned at the appropriate positions that correspond to the respective video reels 3.

In the present embodiment, a video reel depicts through videos the rotational and stop motions of a mechanical reel having a plurality of symbols drawn on the peripheral surface thereof. To each of the video reels 3, a symbol array comprised of a previously determined plurality (for example, 22) of symbols is assigned (see FIG. 5 which is described later).

In the symbol display region 4, the symbol arrays assigned to the respective video reels 3 are separately scrolled, and are stopped after predetermined time has elapsed. As a result, a part (three consecutive symbols in the present embodiment) of each of the symbol arrays is displayed for the player.

The symbol display region 4 has three regions, namely an upper region, a central region, and a lower region, for each video reel 3, and a single symbol is to be displayed to each region. That is, 15 (=5 columns×3 symbols) symbols are to be displayed in the symbol display region 4.

In the present embodiment, a line formed by selecting one of the aforementioned three regions for each of the video reels 3 and connecting the respective regions is referred to as a winning line (pay line).

It is to be noted that any desired shape of the winning line can be adopted, and examples of the shape of the winning line may include a straight line formed by connecting the central regions for the respective video reels 3, a V-shaped line, and a bent line. Also, any desired number of lines can be adopted, and the number can be for example 30 lines.

In addition, the lower image display panel 141 has a number-of-credits display region 142 and a number-of-payouts display region 143. The number-of-credits display region 142 displays the number of coins that are coins owned by a player and are deposited inside the gaming machine 1 (hereinafter, referred to as the number of credits). In addition, the number-of-payouts display region 143 displays the number of coins to be paid out to a player when a winning prize has been established (hereinafter, referred to as the number of payouts).

The lower image display panel 141 has a built-in touch panel 114. The player can input various commands by touching the lower image display panel 141.

On the lower side of the lower image display panel 141, there are arranged various buttons set in a control panel 30, and various devices to be operated by the player.

A spin button 31 is used when starting scrolling of the symbol arrays of the respective video reels 3. A change button 32 is used when requesting a game facility staff member to exchange money. A CASHOUT button 33 is used when paying out the coins retained inside the gaming machine 1 to a coin tray 15.

A 1-BET button 34 and a maximum BET button 35 are used for determining the number of coins (hereinafter also referred to as "the number of BETs") to be used in the game from the coins retained inside the gaming machine 1. The 1-BET button 34 is used when determining one coin at a time for the aforementioned number of BETs. The maximum BET button 35 is used when setting the aforementioned number of BETs to a defined upper limit number.

A coin accepting slot 36 is provided to accept coins. A bill validator 115 is provided to accept bills. The bill validator 115 validates a bill, and accepts a valid bill into the cabinet 11. It is to be noted that the bill validator 115 may be configured so as to be capable of reading a later-described ticket 175 with a barcode.

An upper image display panel 131 is provided at the front face of the top box 12. The upper image display panel 131 includes a liquid crystal panel, and forms the display. The upper image display panel 131 displays images related to effects and images showing introduction of the game contents and explanation of the game rules. Further, the top box 12 is provided with a speaker 112 and a lamp 111. The gaming machine 1 produces effects by displaying images, outputting sounds, and outputting the light.

In addition, at the periphery of the upper image display panel 131, a game panel 133 is provided so as to circumferentially surround the upper image display panel 131. The game panel 133 consists of a light transmissible acrylic plate. On the game panel 133, pictures are printed indicating the contents of a plurality of cells (frames), for example, twenty four cells C1 to C24. The game panel 133 is a panel to be used in a second game. The second game includes a game such as a dice game or a game of life, for example.

Twenty four cells C1 to C24 include a "START" cell C1 and a "GOAL" cell C24. A route in which a piece can move clockwise is made of twenty four cells from the "START" cell C1 to the "GOAL" cell C24. At an initial stage when a second game has been started, a piece is positioned in the "START" cell C1. When the second game is executed, one cell is selected from among the twenty four cells and then the piece is moved to the selected cell. A prize is awarded to a player or a mini game is executed according to the contents of the cell to which the piece has moved. The specific contents of twenty four cells C1 to C24 will be described later in detail.

A lamp 135 (not shown) is provided at the rear of the game panel 133. The lamp 135 is made of an LED lamp, functions as a backlight of the game panel 133, and illuminates the game panel 133 from behind. The lamp 135 illuminates the game panel 133 with a predetermined brightness. When the lamp 135 is illuminated, light is emitted from the lamp 135 and then the entire game panel 133 is illuminated. Alternatively, the lamp 135 turns off, no light is emitted from the lamp 135 and then, the entire game panel 133 becomes dark.

The lamp 135 is made of a plurality of lamps so that the entire game panel 133 can be illuminated with a uniform brightness. All of the plurality of lamps turn on or turn off. The lamp 135 is connected to be interlocked with a power source of the gaining machined 1, and when the gaining machine 1 is powered ON, the lamp 135 lights up, alternatively, when the gaming machine 1 is powered off, the lamp 135 turns off.

A through hole 139 according to the shape and size of the upper image display panel 131 is formed at a center portion of the game panel 133. The upper image display panel 131 is disposed so as to be engaged in the through hole 139. That is, the through hole 139 forms a region in which the upper image display panel 131 is to be disposed, and the upper image display panel 131 is disposed in the appropriate disposition region.

In a case where the upper image display panel 131 has been disposed at a corner part, cells (pieces) to be employed in a game such as a dice game or a game of life cannot be formed in a easily visually recognizable ring shape. The upper image display panel 131 can be disposed by effectively utilizing a dead space of a plurality of cells that are formed in a ring shape so as to circumferentially surround the upper image display panel 131.

A ticket printer 171, a card slot 176, a data display 174, and a key pad 173 are provided to be oriented downward of the upper image display panel 131.

The ticket printer 171 prints on a ticket a barcode representing encoded data of the number of credits, date, the identification number of the gaming machine 1, and the like, and outputs the ticket as the ticket with a barcode 175. The player can make a gaming machine read the ticket with a barcode 175 so as to play a game thereon, and can also exchange the ticket with a barcode 175 with a bill or the like at a predetermined place (e.g. a cashier in a casino) in the game facility.

The card slot 176 is for inserting a card in which predetermined data is stored. For example, the card stores data for identifying the player, and data about the history of games played by the player.

When the card is inserted into the card slot 176, a later-described card reader 172 reads data from the card or writes data into the card. It is to be noted that the card may store data corresponding to a coin, a bill or a credit.

The data display 174 includes a fluorescent display, LEDs and the like, and displays the data read by the card reader 172 or the data inputted by the player via the keypad 173, for example. The keypad 173 is for inputting a command and data related to ticket issuance or the like.

[Symbol Arrays of Video Reels]

The overall configuration of the gaming machine 1 has been described above. Next, with reference to FIG. 5, a configuration of the symbol arrays included in the video reels 3 of the gaming machine 1 is described.

FIG. 5 is a view illustrating the arrangements of symbols drawn on the peripheral surfaces of the video reels of the gaming machine according to the embodiment of the present invention.

A first video reel 3*a*, a second video reel 3*b*, a third video reel 3*c*, a fourth video reel 3*d*, and a fifth video reel 3*e* each is assigned with a symbol array consisting of 22 symbols that correspond to respective code numbers from "00 " to "21".

Types of the symbols provided are "JACKPOT 7", "BLUE 7", "BELL", "CHERRY". "STRAWBERRY", "PLUM", "ORANGE", and "APPLE",

[Configuration of Circuit Included in Gaming Machine]

The configuration of the symbol arrays included in the video reels 3 of the gaming machine 1 has been described above. Next, with reference to FIG. 6, a configuration of a circuit included in the gaming machine 1 is described.

Figure 6:
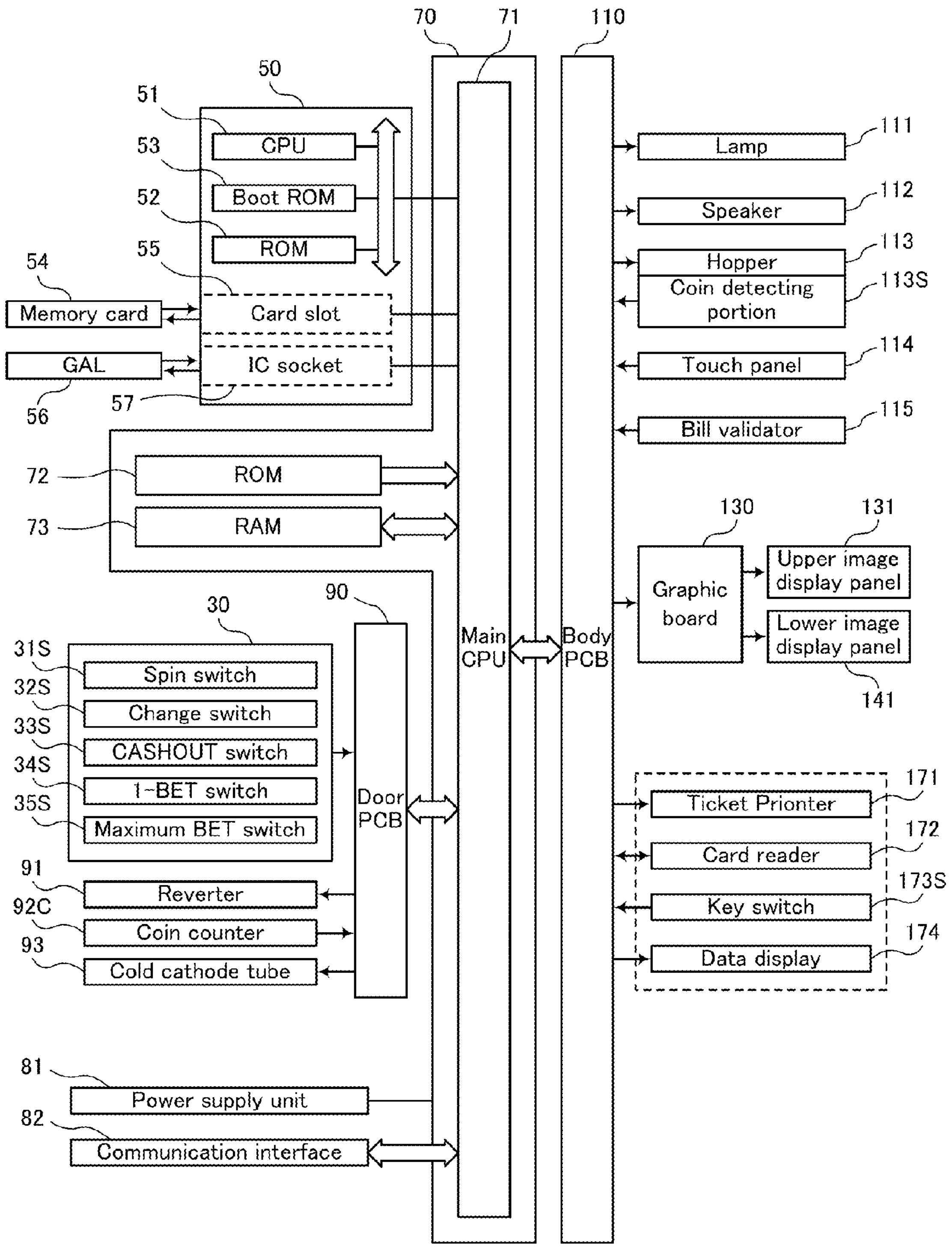
FIG. 6 is a block diagram depicting an internal configuration of the gaming machine according to the embodiment of the present invention.

FIG. 6 is a block diagram illustrating an internal configuration of the gaming machine according to the embodiment of the present invention.

A gaming board 50 is provided with: a CPU 51, a ROM 52, and a boot ROM 53, which are mutually connected by an internal bus; a card slot 55 corresponding to a memory card 54; and an IC socket 57 corresponding to a GAL (Generic Array Logic) 56.

The memory card 54 includes a non-volatile memory, and stores a game program and a game system program. The game program includes a program related to game progression, a lottery program, and a program for producing effects by images and sounds (e.g. see FIGS. 8 to 19 which are described later). Further, the aforementioned game program includes data (see FIG. 5) specifying the configuration of the symbol array assigned to each video reel 3.

The lottery program is a program for determining to-be stopped symbol of each video reel 3 by lottery. The to-be stopped symbol is data for determining three symbols to be displayed to the symbol display region 4 out of the 22 symbols forming each symbol array. The gaming machine 1 of the present embodiment determines as the to-be stopped symbol the symbol to be displayed in a predetermined region (e.g. the upper region) out of the three regions provided for each of the video reels 3 of the symbol display region 4.

The aforementioned lottery program includes symbol determination data. The symbol determination data is data that specifies random values so that each of the 22 symbols (code numbers from "00" to "21") forming the symbol array is determined at an equal probability (i.e. 1/22), for each video reel 3.

The probabilities of the respective 22 symbols being determined are basically equal. However, the numbers of the respective types of symbols included in the 22 symbols vary, and thus the probabilities of the respective types of symbols being determined vary (i.e. different weights on the probabilities are generated). For example, with reference to FIG. 5, the symbol array of the first video reel 3*a* includes one symbol of "JACKPOT 7", and includes seven symbols of "ORANGE". Hence, the former is determined at the probability of "1/22", whereas the latter is determined at the probability of "7/22".

It is to be noted that, although the data specifies that the equal numbers of symbols be provided to form the symbol arrays of the respective video reels 3 in the present embodiment, different numbers of symbols may form the respective video reels 3. For example, the symbol array of the first video reel 3*a* may consist of 22 symbols whereas the symbol array of the second video reel 3*b* may consist of 30 symbols. Such a configuration increases the degree of freedom in setting the probabilities of the respective types of symbols being determined for each video reel 3.

Further, the card slot 55 is configured so that the memory card 54 can be inserted thereinto and removed therefrom, and is connected to a motherboard 70 by an IDE bus.

The GAL 56 is a type of PLD (Programmable Logic Device) having a fixed OR array structure. The GAL 56 is provided with a plurality of input ports and output ports, and predetermined input into the input port causes output of the corresponding data from the output port.

Further, the IC socket 57 is configured so that the GAL 56 can be inserted thereinto and removed therefrom, and is connected to the motherboard 70 by a PCI bus. The contents of the game to be played on the gaming machine 1 can be changed by replacing the memory card 54 with another memory card 54 having another program written therein or by rewriting the program written into the memory card 54 as another program.

The CPU 51, the ROM 52 and the boot ROM 53 mutually connected by the internal bus are connected to the motherboard 70 by a PCI bus. The PCI bus enables a signal transmission between the motherboard 70 and the gaming board 50, and power supply from the motherboard 70 to the gaming board 50.

The ROM 52 stores an authentication program. The boot ROM 53 stores a pre-authentication program, a program (boot code) to be used by the CPU 51 for activating the pre-authentication program, and the like.

The authentication program is a program (tamper check program) for authenticating the game program and the game system program. The pre-authentication program is a program for authenticating the aforementioned authentication program. The authentication program and the pre-authentication program are written along a procedure (authentication procedure) for proving that the program to be the subject has not been tampered.

The motherboard 70 is provided with a main CPU 71, a ROM 72, a RAM 73, and a communication interface 82. The motherboard 70 corresponds to the controller of the present invention. While, in the embodiment, the controller is formed by one CPU referred to as a main CPU 71, the controller in the present invention may be formed of a plurality of CPUs.

The ROM 72 includes a memory device such as a flash memory, and stores a program such as BIOS to be executed by the main CPU 71, and permanent data. When the BIOS is executed by the main CPU 71, processing for initializing predetermined peripheral devices is conducted; further, through the gaming board 50, processing of loading the game program and the game system program stored in the memory card 54 is started.

The RAM 73 stores data and programs which are used in operation of the main CPU 71. For example, when the processing of loading the aforementioned game program, game system program or authentication program is conducted, the RAM 73 can store the program. The RAM 73 is provided with working areas used for operations in execution of these programs. Examples of the areas include: an area that stores a counter for managing the number of games, the number of BETs, the number of payouts, the number of credits and the like; and an area that stores symbols (code numbers) determined by lottery.

The communication interface 82 is for communicating with the external control device 200 such as a server, through the communication line 301. Further, the motherboard 70 is connected with a later-described door PCB (Printed Circuit Board) 90 and a body PCB 110 by respective USBs. The motherboard 70 is also connected with a power supply unit 81.

When the power is supplied from the power supply unit 81 to the motherboard 70, the main CPU 71 of the motherboard 70 is activated, and then the power is supplied to the gaming board 50 through the PCI bus so as to activate the CPU 51.

The door PCB 90 and the body PCB 110 are connected with input devices such as a switch and a sensor, and peripheral devices the operations of which are controlled by the main CPU 71.

The door PCB 90 is connected with a control panel 30, a reverter 91, a coin counter 92C and a cold cathode tube 93.

The control panel 30 is provided with a spin switch 31S, a change switch 32S, a CASHOUT switch 33S, a 1-BET switch 34S and a maximum BET switch 35S which correspond to the aforementioned respective buttons. Each of the switches outputs a signal to the main CPU 71 upon detection of press of the button corresponding thereto by the player.

The coin counter 92C validates a coin inserted into the coin accepting slot 36 based on its material, shape and the like, and outputs a signal to the main CPU 71 upon detection of a valid coin. Invalid coins are discharged from a coin payout exit 15A.

The reverter 91 operates based on a control signal outputted from the main CPU 71, and distributes valid coins validated by the coin counter 92C into a hopper 113 or a cash box (not illustrated). That is, coins are distributed into the hopper 113 when the hopper 113 is not filled with coins, while coins are distributed into the cash box when the hopper 113 is filled with coins.

The cold cathode tube 93 functions as a backlight installed on the rear face sides of the upper image display panel 131 and the lower image display panel 141, and lights up based on a control signal outputted from the main CPU 71.

The body PCB 110 is connected with the lamp 111, the speakers 112, the hopper 113, a coin detecting portion 1135, the touch panel 114, the bill validator 115, a graphic board 130, the ticket printer 171, the card reader 172, a key switch 173S and the data display 174.

The lamp 111 lights up based on a control signal outputted from the main CPU 71. The speakers 112 outputs a sound of back ground music based on a control signal outputted from the main CPU 71.

The hopper 113 operates based on a control signal outputted from the main CPU 71, and pays out coins of the specified number of payouts from the coin payout exit 15A to the coin tray 15. The coin detecting portion 1135 outputs a signal to the main CPU 71 upon detection of coins paid out by the hopper 113.

The touch panel 114 detects a place on the lower image display panel touched by the player's finger or the like, and outputs to the main CPU 71 a signal corresponding to the detected place. Upon acceptance of a valid bill, the bill validator 115 outputs to the main CPU 71 a signal corresponding to the face amount of the bill.

The graphic board 130 controls display of images conducted by the respective upper image display panel 131 and lower image display panel 141, based on a control signal outputted from the main CPU 71. The symbol display region 4 of the lower image display panel 141 displays the five video reels 3 by which the scrolling and stop motions of the symbol arrays included in the respective video reels 3 are displayed. The graphic board 130 is provided with a VDP generating image data, a video RAM temporarily storing the image data generated by the VDP, and the like. A number-of-credit display region 142 of the lower image display panel 141 displays the number-of-credits data stored in the RAM 73. The number-of-payout display portion of the lower image display panel 141 displays the number-of-payout of coins.

The graphic board 130 is provided with the VDP (Video Display Processor) generating image data based on a control signal outputted from the main CPU 71, the video RAM temporarily storing the image data generated by the VDP, and the like. It is to be noted that the image data used in generation of image data by the VDP is included in the game program that has been read from the memory card 54 and stored Into the RAM 73.

Based on a control signal outputted from the main CPU 71, the ticket printer 171 prints on a ticket a barcode representing encoded data of the number of credits stored in the RAM 73, date, the identification number of the gaming machine 1, and the like, and then outputs the ticket as the ticket with a barcode 175.

The card reader 172 reads data stored in a card inserted into the card slot 176 and transmits the data to the main CPU 71, or writes data into the card based on a control signal outputted from the main CPU 71.

The key switch 173S is provided in the keypad 173, and outputs a predetermined signal to the main CPU 71 when the keypad 173 has been operated by the player.

The data display 174 displays data read by the card reader 172 and data inputted by the player through the keypad 173, based on a control signal outputted from the main CPU 71.

[Configuration of Symbol Combination Table]

The description of the circuit construction of the gaming machine 1 has now been completed. Next, with reference to FIG. 7, a symbol combination table will be described. FIG. 7 is a view showing the symbol combination table of the gaming machine according to the embodiment.

A symbol combination table specifies symbol combinations of symbols according to winning prizes and the number of payouts. In the gaming machine 1, a winning prize is established in the case where scrolling of the symbol arrays of the respective video reels 3 is stopped and then a combination of symbols displayed on a winning line coincides with a combination of symbols which are specified according to the symbol combination table. A privilege such as payout of coins or start of bonus game is then given to a player according to a winning combination. Alternatively, in the case where a combination of symbols which are displayed on a winning line does not coincide with any combination of symbols which are displayed on a winning line according to the symbol combination table, no winning prize (a so called "losing") is established.

Basically, a winning prize is established in the case where all of the symbols displayed on a winning line according to the respective video reels 3 are arranged as a combination of symbols of one type from among "JACKPOT 7", "APPLE", "BLUE 7", "BELL", "CHERRY", "STRAWBERRY", "PLUM", and "ORANGE". However, with respect to symbols of types such as "CHERRY" and "ORANGE", a winning prize is established in the case where one or three symbols of either one type of them is or are displayed on a winning line according to the video reels 3 as well.

For example, in the case where symbols "BLUE 7" are arranged on a winning line according to all the video reels 3, a winning combination is realized as "BLUE" and then "10" is determined as the number of payouts. Coin payout is then performed based on the determined number of payouts. The above coin payout is performed by actually discharging coins from a coin payout exit 15A, adding the number of coins to the number of credits, or issuing a barcode ticket.

"JACKPOT 7" is a symbol to be associated with a jackpot trigger. In the case where "JACKPOT 7" symbols are displayed to be arranged on a winning line according to all the video reels 3, a winning prize is realized as a "jackpot" and then the amount of jackpot is determined as the number of payouts.

"APPLE" is a symbol to be associated with a bonus trigger. In the case where "APPLE" symbols are displayed to be arranged on a winning line according to all the video reels 3, the number of winning prizes is realized as a "bonus game trigger", the corresponding bonus game is started from a next time of play.

[Contents of Program]

The determination of the symbols combination table has been described above. Next, with reference to FIGS. 8 to 19, the program to be executed by the gaming machine 1 is described.

<Main Control Processing>

Figure 8:
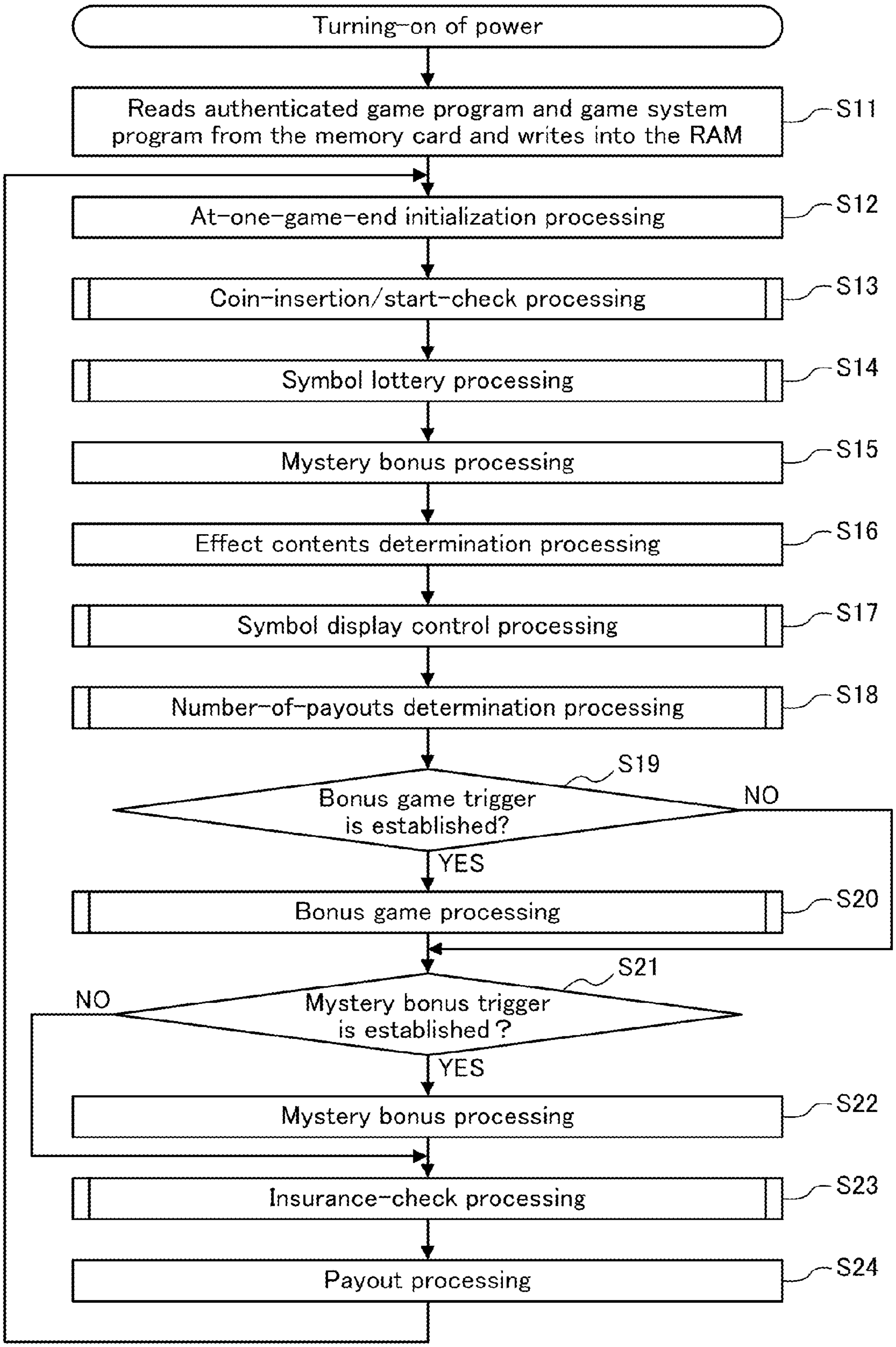
FIG. 8 is a flowchart showing a subroutine of main control processing of the gaming machine according to the embodiment of the present invention.

First, with reference to FIG. 8, main control processing is described.

FIG. 8 is a view illustrating a flowchart of the main control processing for the gaming machine according to the embodiment of the present invention.

First, when the power is supplied to the gaming machine 1, the main CPU 71 reads the authenticated game program and game system program from the memory card 54 through the gaming board 50, and writes the programs into the RAM 73 (step S11).

Next, the main CPU 71 conducts at-one-game-end initialization processing (step S12). For example, data that becomes unnecessary after each game in the working areas of the RAM 73, such as the number of BETs and the symbols determined by lottery, is cleared.

The main CPU 71 conducts coin-insertion/start-check processing which is described later with reference to FIG. 9 (step S13). In the processing, input from the BET switch and the spin switch is checked.

The main CPU 71 then conducts symbol lottery processing which is described later with reference to FIG. 12 (step S14). In the processing, to-be stopped symbols are determined based on the symbol table for normal game and the random values for symbol determination.

Next, the main CPU 71 conducts mystery bonus lottery processing (step S15). In the processing, lottery determining whether or not to establish a mystery bonus trigger is held. For example, the main CPU 71 extracts a random value for mystery bonus from the numbers in a range of "0 to 99", and establishes the mystery bonus trigger when the extracted random value is "0".

The main CPU 71 conducts effect contents determination processing (step S16). The main CPU 71 extracts a random value for effect, and determines any of the effect contents from the preset plurality of effect contents by lottery.

The main CPU 71 then conducts symbol display control processing which is described later with reference to FIG. 13 (step S17). In the processing, scrolling of the symbol array of each video reel 3 is started, and the to-be stopped symbol determined in the symbol lottery processing of step S14 is stopped at a predetermined position (e.g. the upper region in the symbol display region 4). That is, three symbols including the to-be stopped symbol are displayed in the symbol display region 4. For example, when the to-be stopped symbol is the symbol associated with the code number of "10" and it is to be displayed to the upper region, the symbols associated with the respective code numbers of "11", "12" and "13" are to be displayed to the respective central region and lower region in the symbol display region 4.

Next, the main CPU 71 conducts number-of-payouts determination processing to be described later with reference to FIG. 14 (step S18). In this processing, the number of payouts is determined based on a combination of symbols that are displayed on a winning line and then the determined number of payouts is stored in a number-of-payouts storage area that is provided in the RAM 73.

Next, the main CPU 71 determines whether or not a bonus game trigger has been established (step S19). When the main CPU 71 determines that the bonus game trigger has been established, the main CPU 71 conducts bonus game processing to be described later with reference to FIG. 16 (step S20).

Next, when the main CPU 71 determines that the bonus game trigger has not been established subsequent to the processing of step S20 or in step S19, the CPU 71 then determines whether or not a mystery bonus trigger has been established (step S21). When the main CPU 71 determines that the mystery bonus trigger has been established, the main CPU 71 conducts mystery bonus processing (step S22). In this processing, the number of payouts (for example, 300) that is set for mystery bonus is stored in the number-of-payouts storage area that is provided in the RAM 73.

After the processing of step S22 or when determining in step S21 that the mystery bonus trigger has not been established, the main CPU 71 conducts insurance-check processing which is described later with reference to FIG. 15 (step S23). In the processing, whether or not to conduct payout by the insurance is checked.

The main CPU 71 conducts payout processing (step S24). The main CPU 71 adds the value stored in the number-of-payouts storage area to a number-of-credits storage area provided in the RAM 73. It is to be noted that operations of the hopper 113 may be controlled based on input from the CASH-OUT switch 33S, and coins of the number corresponding to the value stored in the number-of-payouts storage area may be discharged from the coin payout exit 15A. Further, operations of the ticket printer 171 may be controlled and a ticket with a barcode may be issued on which a value stored in the number-of-payouts storage area is recorded. After the processing has been conducted, the processing is shifted to step S12.

<Coin-insertion/Start-check Processing>

Figure 9:
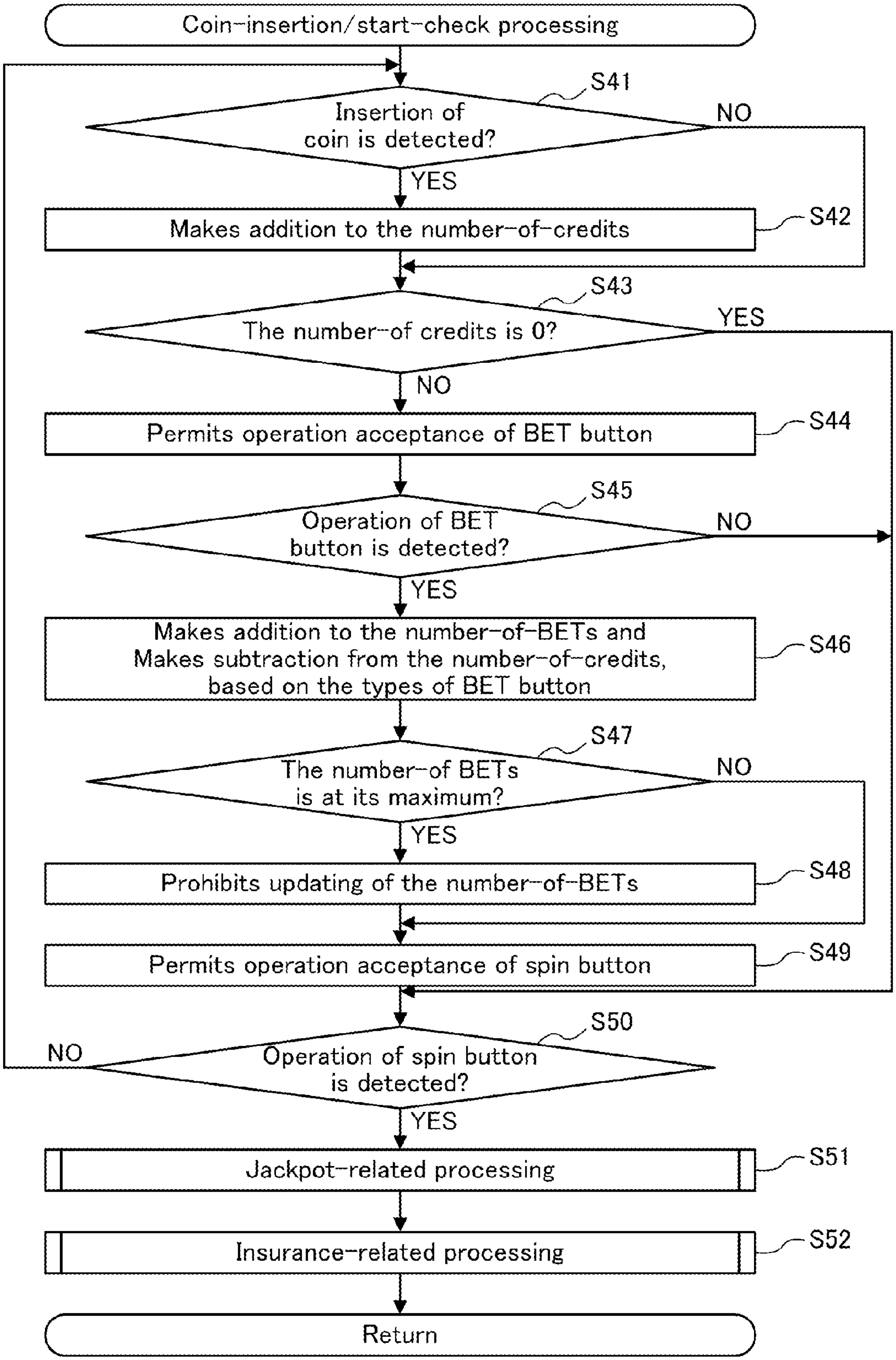
FIG. 9 is a flowchart showing a subroutine of coin insertion/start check processing of the gaming machine according to the embodiment of the present invention.

Next, with reference to FIG. 9, coin-insertion/start-check processing is described.

FIG. 9 is a view illustrating a flowchart of the coin-insertion/start-check processing for the gaming machine according to the embodiment of the present invention.

First, the main CPU 71 determines whether or not insertion of a coin has been detected by the coin counter 92C (step S41). When determining that the insertion of a coin has been detected, the main CPU 71 makes an addition to the number-of-credits counter (step S42). It is to be noted that, in addition to the insertion of a coin, the main CPU 71 may determine whether or not insertion of a bill has been detected by the bill validator 115, and when determining that the insertion of a bill has been detected, the main CPU 71 may add a value according to the bill to the number-of-credits counter.

After step S42 or when determining in step S41 that the insertion of a coin has not been detected, the main CPU 71 determines whether or not the number-of-credits counter is zero (step S43). When the main CPU 71 determines that the number-of-credits counter is not zero, the main CPU 71 permits operation acceptance of the BET buttons (step S44).

Next, the main CPU 71 determines whether or not operation of any of the BET buttons has been detected (step S45). When the main CPU 71 determines that the BET switch has detected press of the BET button by the player, the main CPU 71 makes an addition to a number-of-BETs counter provided in the RAM 73 and makes a subtraction from the number-of-credits counter, based on the type of the BET button (step S46).

Next, the main CPU 71 determines whether or not a value stored in a number-of-BETs storage area is set to a maximum value (step S47). When the main CPU 71 determines that the value stored in the number-of-BETs storage area is the maximum, the main CPU 71 disallows for updating of the value stored in the number-of-BETs storage area and then turns on a maximum BET flag (step S48). When the main CPU 71 determines that the value stored in the number-of-BETs subsequent to step s48 or in step S47 is not set to the maximum value, the main CPU 71 determines whether or not the maximum BET flag is turned on (step S49).

After step S49 or when determining in step S45 that the operation of any of the BET buttons has not been detected, or when determining in step S43 that the number-of-credits counter is zero, the main CPU 71 determines whether or not operation of the spin button has been detected (step S50). When the main CPU 71 determines that the operation of the spin button has not been detected, the processing is shifted to step S41.

When the main CPU 71 determines that the operation of the spin button has been detected, the main CPU 71 conducts jackpot-related processing which is described later with reference to FIG. 10 (step S51). In the processing, the amount to be accumulated to the amount of jackpot is calculated, and the amount is transmitted to the external control device 200.

Next, the main CPU 71 conducts insurance-related processing which is described later with reference to FIG. 11 (step S52). In the processing, counting of the number of games is conducted which triggers a payout by the insurance. After the processing has been conducted, the coin-insertion/start-check processing is completed.

<Jackpot-related Processing>

Figure 10:
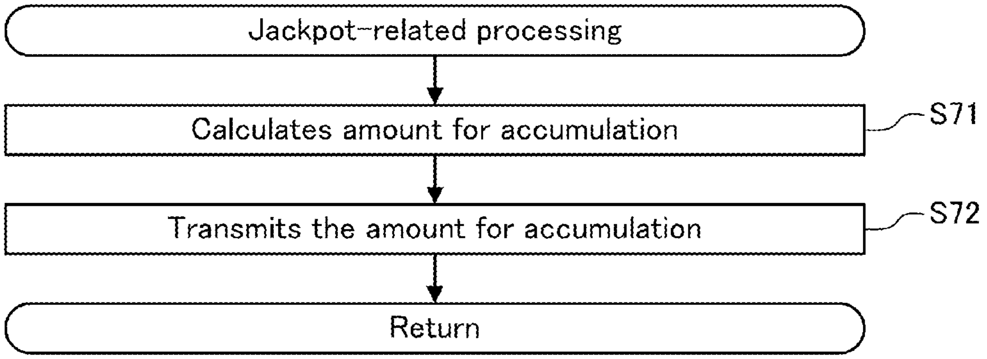
FIG. 10 is a flowchart showing a subroutine of jackpot-related processing of the gaming machine according to the embodiment of the present invention.

Next, with reference to FIG. 10, the jackpot-related processing is described.

FIG. 10 is a view illustrating a flowchart of the jackpot-related processing for the gaming machine according to the embodiment of the present invention.

First, the main CPU 71 calculates the amount for accumulation (step S71). The main CPU 71 obtains the product of the value of the number-of-BETs counter and a preset accumulation ratio, so that the amount for accumulation to the amount of jackpot is calculated.

Next, the main CPU 71 transmits the calculated amount for accumulation to the external control device 200 (step S72). Upon reception of the amount for accumulation, the external control device 200 updates the amount of jackpot. After the processing has been conducted, the jackpot-related processing is completed.

<Insurance-related Processing>

Figure 11:
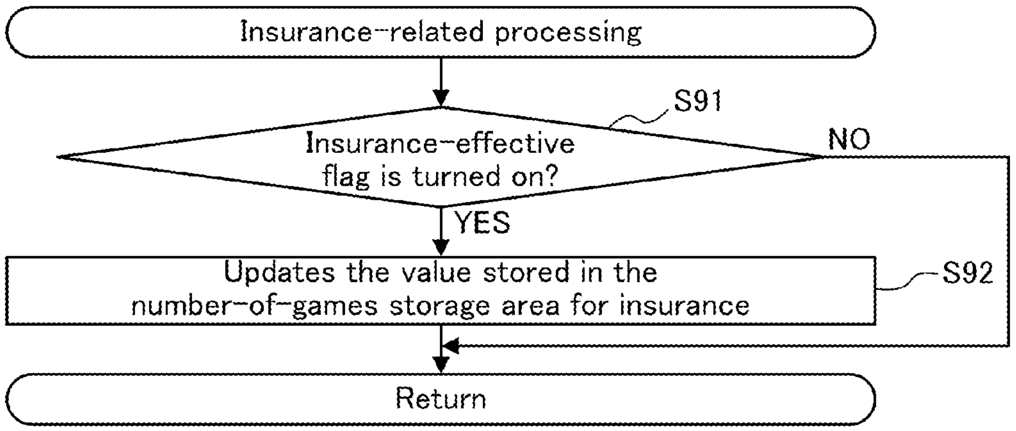
FIG. 11 is a flowchart showing an insurance-related processing of the gaming machine according to the embodiment of the present invention.

Next, with reference to FIG. 11, the insurance-related processing is described.

FIG. 11 is a view illustrating a flowchart of the insurance-related processing for the gaming machine according to the embodiment of the present invention.

First, the main CPU 71 determines whether or not an insurance-effective flag is turned on (step S91). The insurance-effective flag is turned on when a command to make the insurance effective is inputted by the player in the insurance selection processing which is described later with reference to FIG. 17.

When the main CPU 71 determines that the insurance-effective flag is not turned on, the main CPU 71 completes the insurance-related processing. On the other hand, when the main CPU 71 determines that the insurance-effective flag is turned on, the main CPU 71 updates a value stored in a number-of-games storage area for insurance provided in the RAM 73 (step S92). The number-of-games storage area for insurance is a counter for managing the number of games up to the time of the payout by the insurance. In the processing of step S92, the main CPU 71 adds one to the number-of-games storage area for insurance. After the processing has been conducted, the insurance-related processing is completed, <Symbol Lottery Processing>

Figure 12:
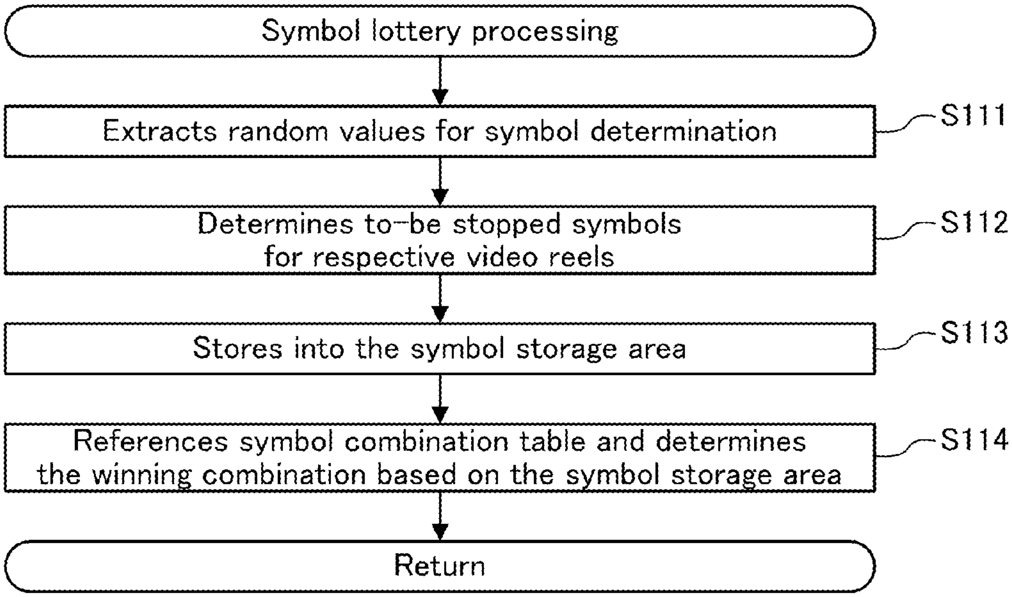
FIG. 12 is a flowchart showing a subroutine of symbol lottery processing of the gaming machine according to the embodiment of the present invention.

Next, with reference to FIG. 12, the symbol lottery processing is described.

FIG. 12 is a view illustrating a flowchart of the symbol lottery processing for the gaming machine according to the embodiment of the present invention.

First, the main CPU 71 extracts random values for symbol determination (step S111). The main CPU 71 then determines to-be stopped symbols for the respective video reels 3 by lottery (step S112). The main CPU 71 holds a lottery for each video reel 3, and determines any one of the 22 symbols (code numbers from "00" to "21") as a to-be stopped symbol. At this time, a respective one of 22 symbols (code numbers "00" to "21") is determined at an equal probability (namely, 1/22).

Symbol arrays that are formed of a plurality of symbols associated with code numbers are respectively assigned to video reels 3 (a first video reel 3*a*, a second video reel 3*b*, a third video reel 3*c*, a fourth video reel 3*d*, and a fifth video reel 3*e*) that are included in the gaming machine 1 according to the embodiment. A data table indicating a correlation between each of the video reels 3 and each of the symbol arrays is stored in the ROM 72.

The main CPU 71 performs lottery in accordance with each of the video reels 3 and then determines any of the plurality of symbols as a to-be-stopped symbols. At this time, a respective one of the plurality of symbols is determined at an equal probability.

The main CPU 71 then stores the determined to-be stopped symbols for the respective video reels 3 into a symbol storage area provided in the RAM 73 (step S113). Next, the main CPU 71 references the number-of-payouts determination table (FIG. 7) and determines a winning combination based on the symbol storage area (step S114). The main CPU 71 determines the winning combination based on the combination of symbols to be displayed along the winning line by the respective video reels 3 and the symbol combination table. After the processing has been conducted, the symbol lottery processing is completed.

A symbol combination table is intended to specify combinations of symbols of kinds according to winning prizes and the number of payouts. In the gaming machine 1, scrolling of the symbol arrays of the respective video reels 3 is stopped, and a winning prize is established in a case where a combination of symbols that are displayed on a winning line coincides with ant of the combinations of symbols that are specified in accordance with the symbol combination table. In a case where the combination of the symbols that are displayed on the winning line does not coincide with any of the combinations of symbols that are specified in accordance with the symbol combination table, no winning prize (so called "losing") is established.

<Symbol Display Control Processing>

Figure 13:
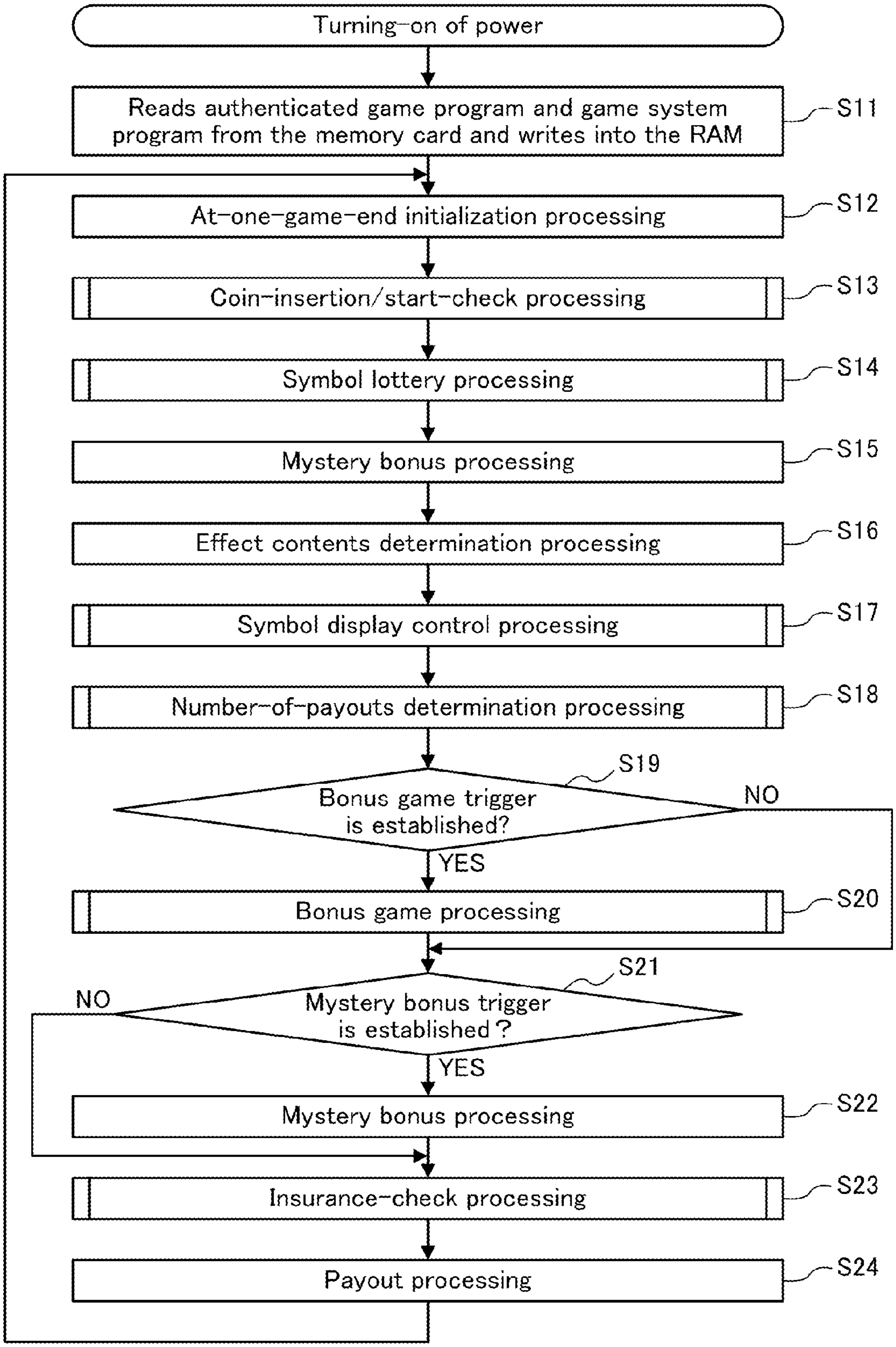
FIG. 13 is a flowchart showing a subroutine of symbol display control processing of the gaming machine according to the embodiment of the present invention.

Next, with reference to FIG. 13, the symbol display control processing is described. FIG. 13 is a view illustrating a flowchart of the symbol display control processing for the gaming machine according to the embodiment of the present invention.

First, the main CPU 71 starts scrolling of the symbol arrays of the respective video reels 3 that are displayed to the symbol display region 4 of the lower image display panel 141 (step S131). The main CPU 71 then stops the scrolling of the symbol array's of the respective video reels 3, based on the aforementioned symbol storage area (step S132). After the processing has been conducted, the symbol display control processing is completed.

While the embodiment describes a case in which the respective symbols form symbol arrays and are vertically scrolled, a mode of variable display of symbols in the present invention is not limited to this example. For example, symbols may be scrolled in a horizontal direction or individual symbols may be displayed to move separately in a display region.

<Number-of-payouts Determination Processing>

Figure 14:
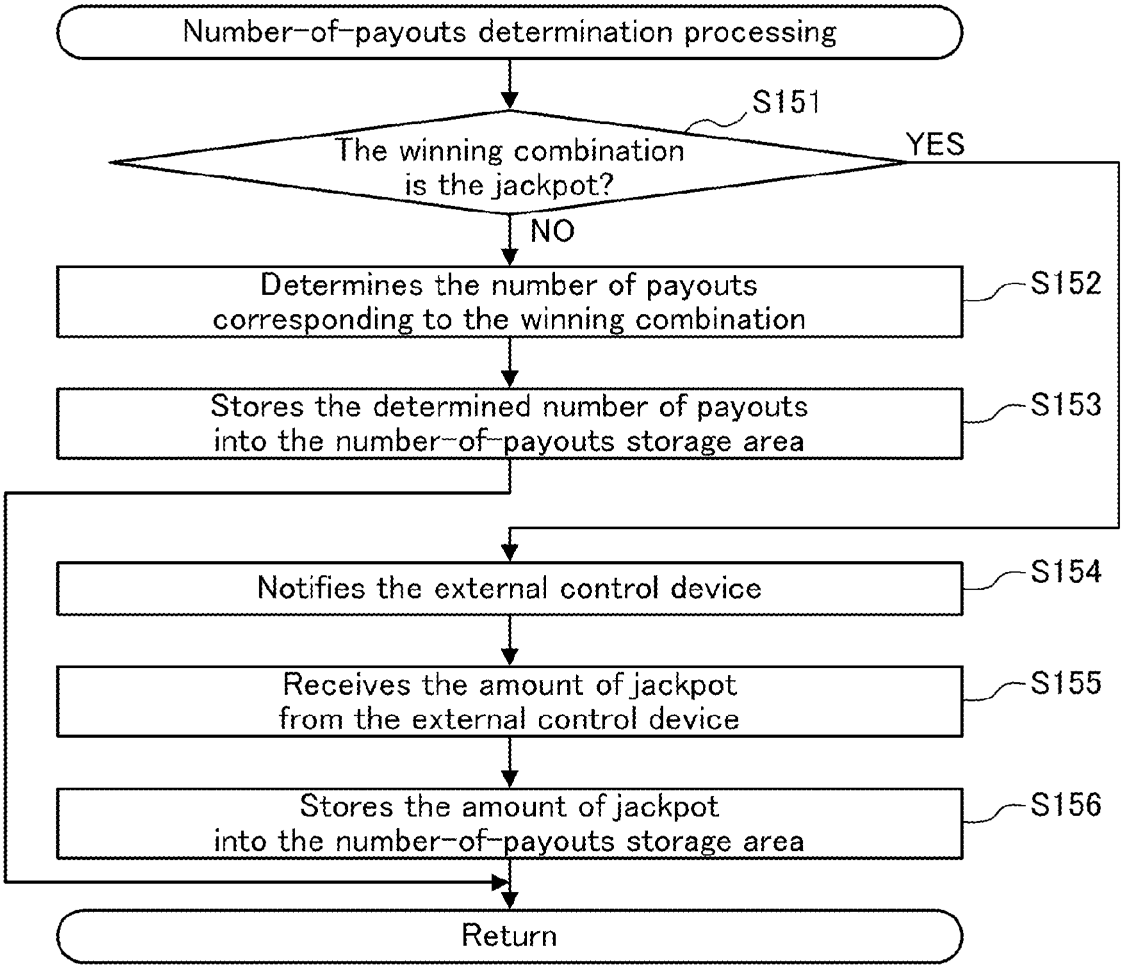
FIG. 14 is a flowchart showing a subroutine of number-of-payouts determination processing of the gaming machine according to the embodiment of the present invention.

Next, with reference to FIG. 14, the number-of-payouts determination processing is described.

FIG. 14 is a view illustrating a flowchart of the number-of-payouts determination processing for the gaming machine according to the embodiment of the present invention.

First, the main CPU 71 determines whether or not the winning combination is the jackpot (step S151). When the main CPU 71 determines that the winning combination is not the jackpot, the main CPU 71 determines the number of payouts corresponding to the winning combination (step S152). For example, the main CPU 71 determines "8" as the number of payouts in the case where the winning combination is "BELL" (with reference to FIG. 7). It is to be noted that the main CPU 71 determines "0" as the number of payouts in the case where the game is lost. Next, the main CPU 71 stores the determined number of payouts into the number-of-payouts storage area (step S153). After the processing has been conducted, the number-of-payouts determination processing is completed.

When the main CPU 71 determines that the winning combination is the jackpot, the main CPU 71 notifies the external control device 200 of the winning of the jackpot (step S154). It is to be noted that, upon reception of the notification, the external control device 200 transmits to the gaming machine 1 the amount of jackpot having updated up to that time. At this time, a part (e.g. 80%) of the amount of jackpot may be the payout subject and the rest (e.g. 20%) may be carried over for the upcoming establishment of the jackpot trigger.

Next, the main CPU 71 receives the amount of jackpot from the external control device 200 (step S155). The main CPU 71 then stores the received amount of jackpot into the number-of-payouts counter (step S156). After the processing has been conducted, the number-of-payouts determination processing is completed.

<Insurance-check Processing>

Figure 15:
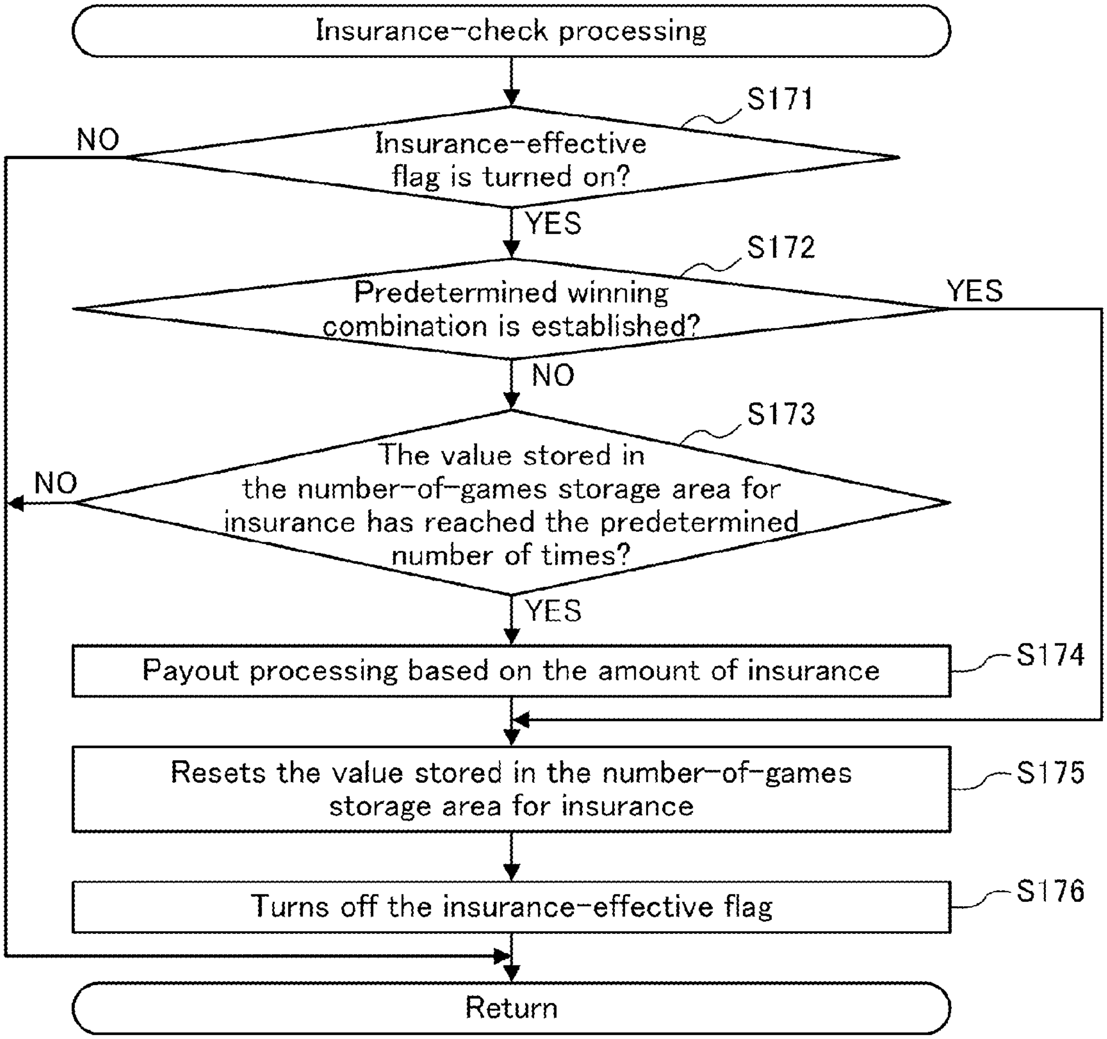
FIG. 15 is a flowchart showing a subroutine of insurance check processing of the gaming machine according to the embodiment of the present invention.

Next, with reference to FIG. 15, the insurance-check processing is described.

FIG. 15 is a view illustrating a flowchart of the insurance-check processing for the gaming machine according to the embodiment of the present invention.

First, the main CPU 71 determines whether or not the insurance-effective flag is turned on (step S171). When the main CPU 71 determines that the insurance-effective flag is not turned on, the main CPU 71 completes the insurance-check processing.

When the main CPU 71 determines that the insurance-effective flag is turned on, the main CPU 71 determines whether or not a predetermined winning combination has been established (step S172). In the present embodiment, "bonus game trigger", "jackpot" and "mystery bonus" are subjects of the predetermined winning combination.

When the main CPU 71 determines that a predetermined winning combination has not been established, the main CPU 71 determines whether or not the value stored in a number-of-games storage area for insurance has reached a predetermined number of times (for example, 300) (step S173). When the main CPU 71 determines that the value stored in the number-of-games storage area for insurance has not reached the predetermined number of times, the main CPU 71 completes insurance check processing.

When the main CPU 71 determines that the value stored in the number-of-games storage area for insurance has reached the predetermined number of times, the main CPU 71 conducts payout processing based on the amount of insurance (step S174). The main CPU 71 adds a predetermined value (for example, 200) as the amount of insurance in the number-of-credits storage area.

When the main CPU 71 determines that a predetermined winning combination has been established subsequent to step S174 or in step S172, the main CPU 71 resets the value stored in the number-of-games storage area for insurance (step S175). Next, the main CPU 71 turns off an insurance-effective flag (step S176). After this processing has been conducted, insurance check processing is completed.

<Insurance Selection Processing>

Figure 17:
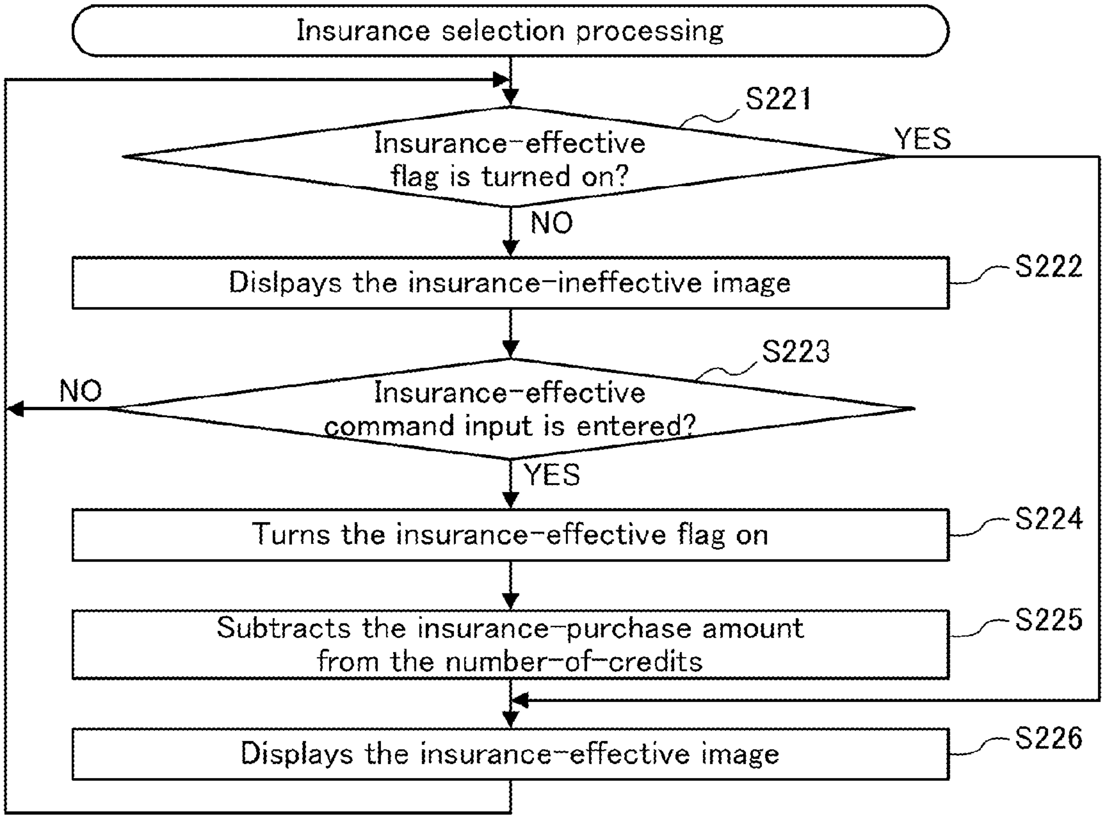
FIG. 17 is a flowchart showing a subroutine of insurance selection processing of the gaming machine according to the embodiment of the present invention.

Next, with reference to FIG. 17, the insurance selection processing is described.

FIG. 17 is a view illustrating a flowchart of the insurance selection processing for the gaming machine according to the embodiment of the present invention.

First, the main CPU 71 determines whether or not the insurance-effective flag is turned on (step S221). When the main CPU 71 determines that the insurance-effective flag is not turned on, the main CPU 71 displays an insurance-ineffective image (step S222). The main CPU 71 transmits a command to display the insurance-ineffective image to the graphic board 130. Based on the command, the graphic board 130 generates the insurance-ineffective image and displays the image to the lower image display panel 141.

As the insurance-ineffective image, for example, an image showing "INSURANCE BET S1.00 TOUCH TO BET" is displayed. This image is an image for prompting the player to select whether or not to make the insurance effective, and notifying the player of the amount required for making the insurance effective. The player can input a command to make the insurance effective by touching a predetermined place on the touch panel 114.

Subsequently, the main CPU 71 determines whether or not an insurance-effective command input has been entered (step S223). When the main CPU 71 determines that the insurance-effective command input has not been entered, the main CPU 71 shifts the processing to step S221 with the insurance-effective flag turned off. On the other hand, when the main CPU 71 determines that the insurance-effective command input has been entered, the main CPU 71 turns the insurance-effective flag on (step S224).

Next, the main CPU 71 subtracts the insurance-purchase amount from the number-of-credits counter (step S225). In the present embodiment, an amount corresponding to, for example, one dollar is subtracted from the number-of-credits counter. After step S225 or when determining in step S221 that the insurance-effective flag is turned on, the main CPU 71 displays the insurance-effective image (step S226).

As the insurance-effective image, for example, an image showing "INSURANCE CONTINUED WIN 200 CREDIT" is displayed. This image is an image informing the player that the insurance is effective, and that the value of "200" is to be added to the number-of-credits counter when the insurance condition is satisfied. After the processing has been conducted, the processing is shifted to step S221.

<<<Bonus Game Processing>>>

Figure 16:
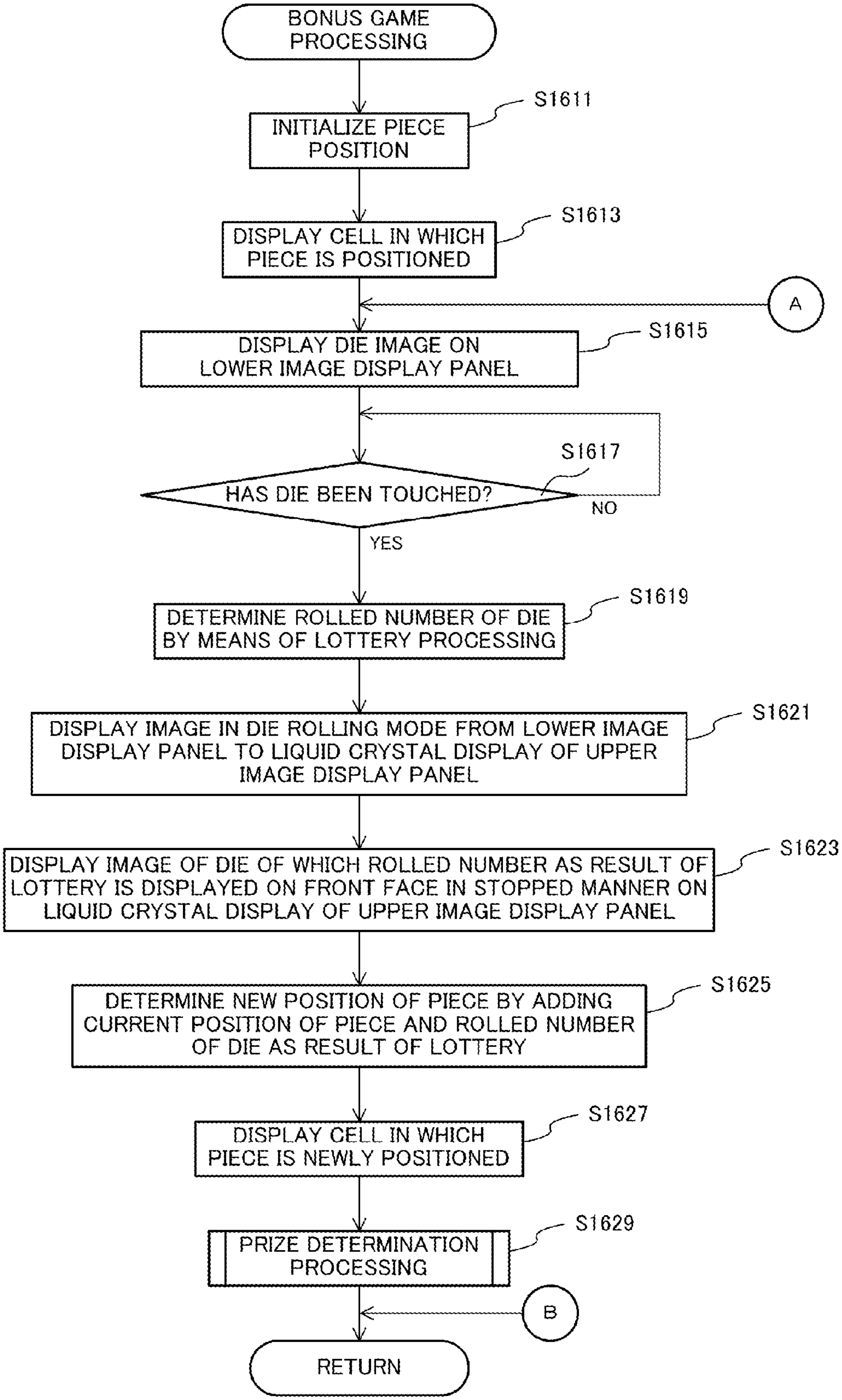
FIG. 16 is a flowchart showing a subroutine of bonus game processing to be invoked and executed in the processing operation of step S20 of FIG. 8.

FIG. 16 is a flowchart showing bonus game processing to be invoked and executed in the processing operation of step S20 of FIG. 8. This bonus game is a so called dice game or a game of life, and is performed on the upper image display panel 131. Hereinafter, the bonus game is referred to as a game of life. As described above, at the periphery of the upper image display panel 131, the game panel 133 is provided so as to circumferentially surround the upper image display panel 131. The game panel 133 consists of an image indicating a plurality of, for example, twenty four cells C1 to C24. The bonus game is not limited to the dice game or the game of life, and may be a game in which a piece is moved along an arrangement of cells in accordance with the progress of the game.

<<Specific Contents of Game of Life>>

A game of life is a game in which a normal game is suspended and started when a predetermined number or more of bonus symbols, for example, three or more bonus symbols have been stopped in a normal game.

As shown in FIG. 20 to FIG. 23, there are a total of twenty four cells (frames) C1 to C24 in the game of life. The game of life is a game in which a piece is advanced to the twenty four cells C1 to C24 and then the routine is performed in accordance with the contents of a cell in which the piece has stopped. The game of life shown in FIG. 20 to FIG. 23 is a game in which the piece is advanced in accordance with a route that is formed by the twenty four cells clockwise from the "START" cell C1 as shown on right-under to the "GOAL" cell C24 on cell C1. Specifically, the game of life is played as described below.

At an initial stage when the game of life is started, the piece is positioned in the "START" cell on the lower right. A player rolls a dice, the piece is advanced along the route by the displayed number of the dice, and then, the routine is performed in accordance with the contents of a cell in which the piece has moved. The contents of cells are predetermined. An operation of advancing the piece in accordance with the rolled number of the dice is repeated until a predetermined completion condition such as arrival of the piece in the "GOAL" cell has been established. A cell in which the piece is positioned indicates a current advancement state.

Among the cells shown in FIG. 20 to FIG. 23, cells C3, C6, C7, C9, C11, C12, C15, C17, C19, and C22 in which numeric values are displayed are prize cells (prize frames). When the piece has stopped in a prize cell, a prize corresponding to the numeric value that is assigned and displayed in that cell is awarded to a player.

Among the cells shown in FIG. 20 to FIG. 23, cells C5 and C14 in which "?" marks are displayed are non-display prize cells (non-display prize frames). These cells are cells in which the "?" marks are generally displayed and whose contents are not identifiable to a player. When the piece has stopped in this cell, the contents of the cell are displayed and then a predetermined event is executed. A numeric value according to a result of the event is determined and then a prize is awarded to a player. The event is an event in which a player wins a lottery, for example. When a player has won a first prize, a numeric value 30 is awarded as the prize, when a player has won a second prize, a numeric value 10 is awarded as the prize, or alternatively, when a player has won a third prize, a numeric value 5 is awarded as the prize.

Among the cells shown in FIG. 20 to FIG. 23, if the piece stops in the cell C2 in which a "selection of life" is displayed, a player can select an option of going on to the next stage of education or an option of entering an employment, by means of operation. An operation to be made by a player may be an operation to be made by using a device that can be operated by a player, such as a touch panel 114 or a spin button 31. When a player has selected entering an employment, a numeric value that is assigned to the cell C2 indicating the "selection of life" is immediately awarded to the player as the prize. Alternatively, in a case where a player has selected the option of going on to the next stage of education, when the piece has then stopped in a cell C21 indicating "PAYDAY", a numeric value that is twice of a predetermined numeric value is awarded to the player as the prize.

Among the cells shown in FIG. 20 to FIG. 23, the cell C21 indicating "PAYDAY" has two functions. As described above, in a case where the piece has stopped in the cell C2 indicating the "selection of life" and then a player has selected the option of going on to the next stage of education, when the piece has stopped in the cell C21 indicating "PAYDAY", a numeric value that is twice of a predetermined numeric value is awarded to the player as the prize. Alternatively, when the piece has stopped in the cell C21 indicating "PAYDAY" without stoppage of the piece in the cell C2 indicating the "selection of life", it functions as a normal prize cell. A numeric value assigned to the cell C21 indicating "PAYDAY" is awarded to a player as the prize.

Among the cells shown in FIG. 20 to FIG. 23, if the piece stops in the cells C4, C10, and C18 in which "MINI GAME" is displayed, a selection game is displayed on the lower image display panel 141 and then a player can play the selection game. The player selects one option from among a plurality of options that are displayed on the lower image display panel 141. A numeric value assigned in advance to the selected option is awarded to the player as the prize. A selection operation by a player may be an operation to be made by using a device that can be operated by a player, such as the touch panel 114 or the spin button 31.

Among the cells shown in FIG. 20 to FIG. 23, cells C8, C13, C16, C20, and C23 in which "WIN or LOSE" is displayed are cells indicating a "branch point of life". If the piece stops in these cells, a two-option selection game is displayed on the lower image display panel 141 and then a player can play the selection game. When the player has selected a first option from among the two options, a predetermined numeric value is awarded to the player as the prize. Alternatively, when a player has selected a second option from two options, the game of life is completed. One of the conditions for completing the game of life is that the player has selected the second option from among the two options.

Among the cells shoe in FIG. 20 to FIG. 23, if the piece stops in the cell C24 in which "GOAL" is displayed, a numeric value 400 is first awarded to a player as the prize. Further, the player is allowed to select whether or not to play a selection game. This selection game is a game in which there is a possibility that a further prize can be acquired. When the player has selected no desire to play the selection game, the game of life is completed. One of the conditions for completing the game of life is that the player has selected no play of the selection game.

Alternatively when the player has selected a desire to play the selection game, the selection game is displayed on the lower image display 141 and then the player can play the selection game. The player selects one option from among the two options that are displayed on the lower image display panel 141. A selection operation by a player may be an operation to be made by a device that can be operated by a player, such as the touch panel 114 or the spin button 31.

When a player has selected a first option from among the two options, a result of the selection is assumed to have been successful and then a numeric value 800 that is twice as usual is awarded to the player as the prize. Alternatively, when a player has selected a second option from among the two options, a result of the selection is assumed to have failed and then a numeric value 400 assigned to the cell C24 indicating "GOAL" is awarded to the player as the prize. After this selection game has been completed, the game of life is completed. One of the conditions for completing the game of life is that this selection game has completed.

When the game of life described above has completed, the routine reverts to a normal game to be played by means of symbol display on the lower image display panel 141 again, <<Specific Processing of Bonus Game (Game of Life)>>

The game of life described above is played by executing the bonus game processing shown in FIG. 16.

First, the main CPU 71 initializes a position of a piece (step S1611). For example, the position of the piece is defined as to be the "START" cell C1. By doing this, the game of life can be started from the "START" cell C1. At this time, as shown in FIG. 20 (*a*), an image indicating that the game of life has been started is displayed on the lower image display panel 141, and as shown in FIG. 20 (*b*), title characters of the game of life "THE GAME OF LIFE" is displayed on the upper image display panel 141.

Specifically an identification number for identifying a cell is assigned in advance to each of twenty four cells C1 to C24. In addition, the position of the piece is defined so that a numeric value indicating a current position of the piece corresponds to an identification number of a cell. For example, the "START" cell C1 is assigned to a first cell, a "selection of life" cell is assigned to a second cell, numbers obtained by increasing one by one are sequentially assigned to the respective cells, and a last cell "GOAL" is assigned to a twenty fourth cell C24. In this manner, if a number indicating the position of the piece is 2, it designates that the piece is positioned in the second "selection of life" cell. Alternatively, if a number indicating the position of the piece is 24, it designates that the piece is positioned in the 24th "GOAL" cell.

The numeric value indicating the position of the piece is set to 1 by executing the processing operation of the step S1611 described above. In this manner, the position of the piece is set to the "START" cell C1.

Next, the main CPU 71 displays an arrow-pointing indicator image for indicating the "START" cell on the upper image display panel 131 (step S1613). In this manner, the "START" cell C1 in which the piece is positioned can be clearly indicated for a player by means of the arrow-pointing indicator image.

Next, an image indicating a dice is displayed on the lower image display panel 141 (step S1615). For example, as shown in FIG. 21(*a*), a dice image is displayed on the lower image display panel 141. At this time point, as shown in FIG. 21(*b*), title characters of the game of life "THE GAME OF LIFE" is displayed on the upper image display panel 131.

Next, the main CPU 71 determines whether or not a player has operated the touch panel 114 that is provided on the lower image display panel 141 as if the player were touching on the dice image that is displayed on the lower image display panel 141 (step S1617). When the main CPU 71*s* determines that the player has not operated the touch panel 114 (NO), the main CPU 71 causes the routine to revert to step S1617.

While, in step S1617, a case in which it is determined whether or not the player has operated the touch panel 114 was shown, it may be determined whether or not the player has operated the spin button 31. In addition, the device operated by a player is not limited to the touch panel 114 or the spin button 31, any device may be operated as long as it can be operated by a player.

In accordance with the processing operations of steps S1615 to S1617 described above, if the routine migrates from a normal game to a bonus game on the lower image display panel 141 forming a display area displaying a game result of a mere slot game, the panel can function as a controller of a dice game or a game of life that is displayed on the upper image display panel 131.

When, in the step S1617 described above, the main CPU 71 determines that the player has operated the touch panel 114 (YES), the CPU 71 determines a rolled number of a dice by means of lottery processing (step S1619). For example, one of the six integer values from 1 to 6 is determined as the rolled number of the dice by means of lottery processing.

In the example described above, there was shown a case in which an image indicating a dice is displayed in step S1615, it is determined that the player has operated the touch panel 114 in step S1617, and then, a rolled number of the dice is determined by means of lottery processing in step S1619. The sequential order of processing operations is not limited thereto, whereas it may be that lottery processing of a rolled number of a dice is first executed, and then, an image indicating a dice is displayed, or alternatively, it may be determined whether or not a player has operated the touch panel 114. Alternatively, it may be determined whether or not a player has operated the touch panel 114 by executing lottery processing of a rolled number of a dice after displaying an image indicating the dice.

Next, the main CPU 71 displays an image that can be visually recognized so that a dice rolls and moves from the lower image display panel 141 on which the dice starts movement to the upper image display panel 131 (step S1621). For example, as shown in FIG. 21(*a*), FIG. 22(*a*), and FIG. 22(*b*), an image is displayed as if an imaged dice were gradually moving while rolling from a center part of the lower image display panel 141 to a center part of a liquid crystal display of the upper image display panel 131.

The processing operation of step S1621 is executed by issuing a first control signal from the main CPU 71 to the lower image display panel 141 and then issuing a second control signal to the upper image display panel 131. The first control signal is a control signal for displaying an image in a dice rolling mode on the lower image display panel 141. The second control signal is issued from the main CPU 71 to the upper image display panel 131 after a first predetermined period of time has elapsed after output of the first control signal has been started. The second control signal is a control signal for display control to display an image in a dice rolling mode on the second display.

Further, the output of the first control signal completes after a second predetermined period of time has elapsed after the output of the first control signal has been started.

In a case where the second predetermined period of time is longer than the first predetermined period of time, it includes a period of time during which a dice image is displayed in an overlapping manner on each of the lower image display panel 141 and the upper image display panel 131. For example, a lower portion of a dice is displayed at an upper part of the lower image display panel 141, and the remaining portion of the dice is displayed at a lower part of the upper image display panel 131. In this manner, an appearance that the dice is rolling can be smoothly displayed.

On the other hand, in a case where the second predetermined period of time is longer than the first predetermined period of time, a dice image on the lower image display panel 141 is displayed as if it were disappearing and then the dice image having disappeared therefrom is suddenly appearing on the upper image display panel 131. There exists a non-display time indicating that no dice image is displayed on the lower image display panel 141 or the upper image display panel 131, thus enabling a player to have a tense atmosphere.

Next, the main CPU 71 displays a dice image on the upper image display panel 131 as to stop at the rolled number of the dice that is determined by means of lottery processing of step S1619 (step S1623). For example, as shown in FIG. 22(*b*), at a center part of a liquid crystal display of the upper image display panel 131, a dice image is displayed so that the rolled number of the dice that is determined by means of lottery processing is displayed on a front face.

The processing operation of step S1623 is executed by means of the second control signal that is issued from the main CPU 71 to the upper image display panel 131. The second control signal includes a control signal for displaying a dice image in a stopped manner so that the rolled number of the dice that is determined by means of lottery processing of step S1619 is displayed after the processing operation of step S1623 described above has been executed.

Next, the main CPU 71 computes a numeric value indicating a new position of a piece by adding the rolled number of a dice to a numeric value indicating a current position of the dice (step S1625). The numeric value indicating the new position of the piece indicates an identification number of a cell to which the piece should move. The rolled number of the dice is determined by means of lottery processing of step S1619 described above.

Next, the main CPU 71 displays a cell which the pierce is newly positioned (step S1627).

Figure 23:
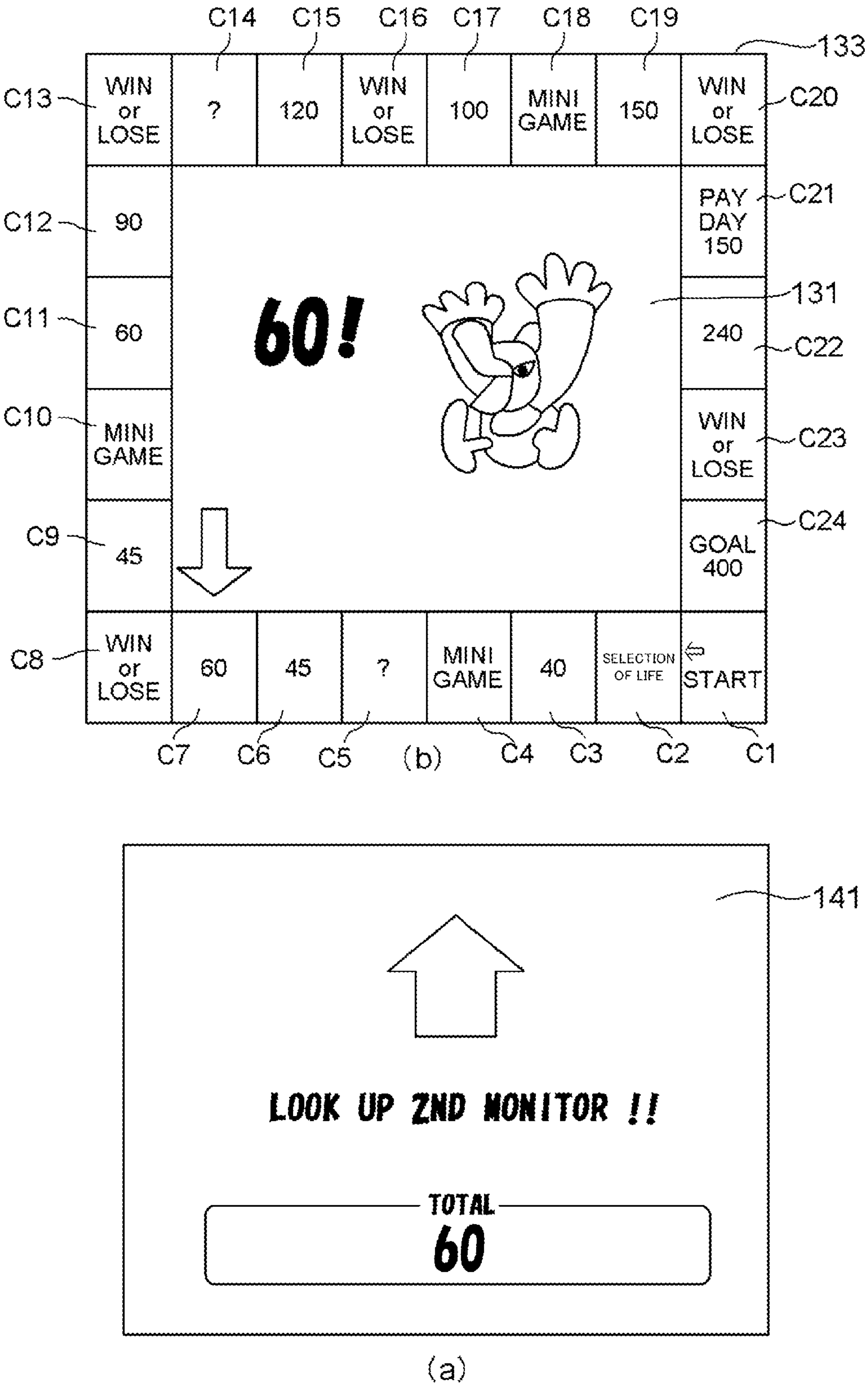
FIG. 23 is a front view showing a state when a piece is positioned in a predetermine cell (frame).

As described above, the cell in which the piece is currently positioned is indicated by means of the arrow-pointing indicator image that is displayed on the upper image display panel 131. Similarly, in accordance with the processing operation of step S1627, the piece moves in accordance with the rolled number of the dice and then the cell in which the piece is newly position is also indicated by means of the arrow-pointing indicator image that is displayed on the upper image display panel 131. For example, as shown in FIG. 23(*a*), the lower image display panel 141 displays: a total number of prizes to be awarded to a player who has started a game of life; a message "LOOK UP 2ND MONITOR!!"; and an upward arrow image. In addition, as shown in FIG. 23(*b*), the upper image display panel 131 displays an arrow-pointing indicator image indicating a cell C7 in which the piece is newly positioned; a prize to be awarded in accordance with the cell C7 in which the piece is newly positioned at this time; and a character image.

In addition, when the piece moves to a new cell, the piece may be displayed so as to move on a one-by-one cell basis until the piece has reached the new cell. For example, an arrow-pointing indicator image for indicating a cell is also displayed on the upper image display panel 131 while the image is sequentially moved. By doing this, the piece can be displayed so as to sequentially move until the piece has reached a new cell that is computed in the processing operation of step S1625.

Further, the upper image display panel 131 displays a rendering image that corresponds to the contents of a cell in which the piece is newly positioned, in the processing operation of step S1627. One selected cell can be suggested by displaying the rendering image that corresponds to the contents of the cell on the upper image display panel 131 as well as the indicator image indicating the cell, and a display area can be effectively utilized.

Next, the min CPU 71 invokes and executes a subroutine of prize determination processing shown in FIG. 18 to be described later (step S1629) and then completes this subroutine.

<<Prize Determination Processing>>

Figure 18:
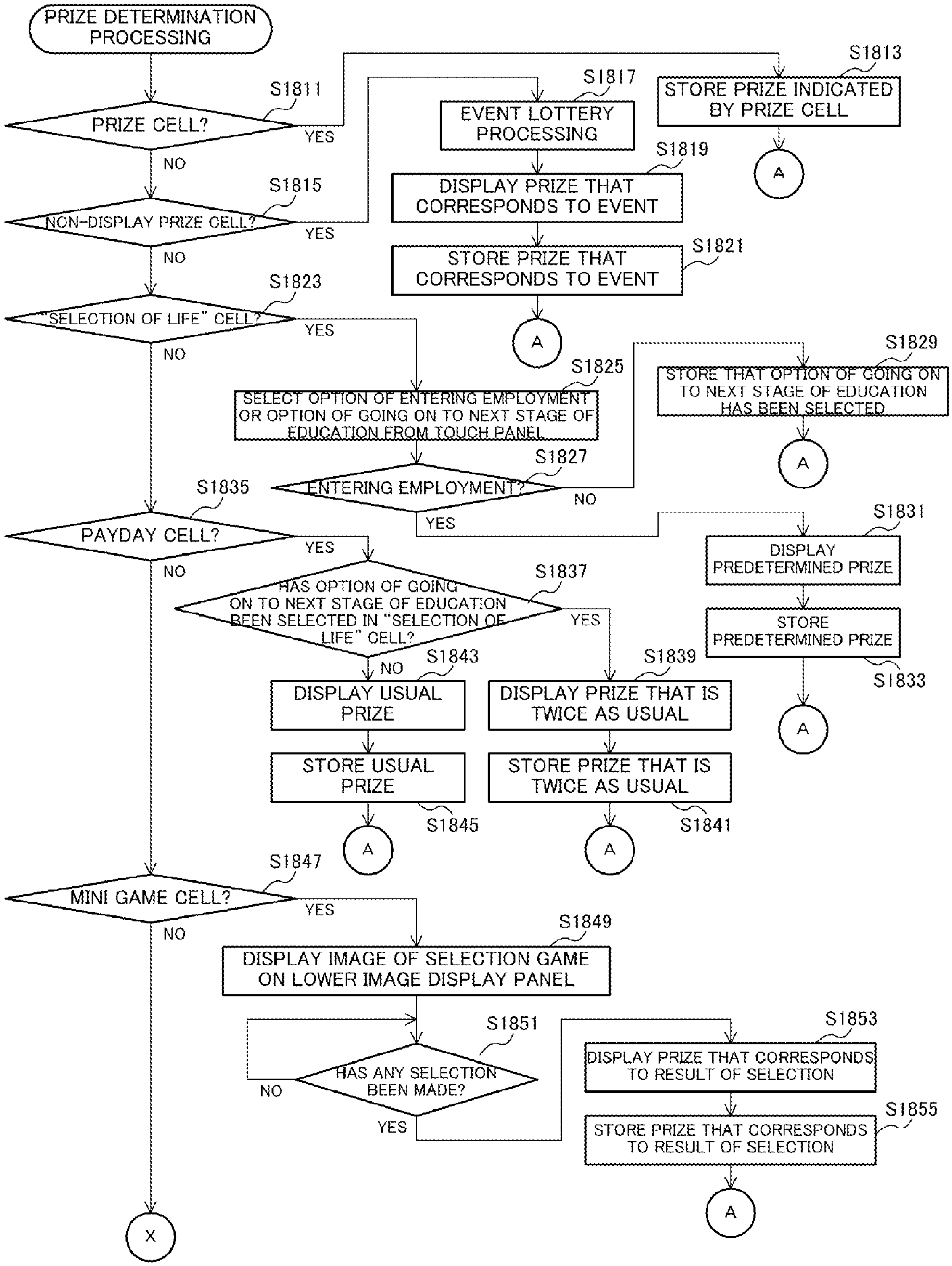
FIG. 18 is a flowchart showing a subroutine of prize determination processing to be invoked and executed in the processing operation of step S1629 of FIG. 16.
Figure 19:
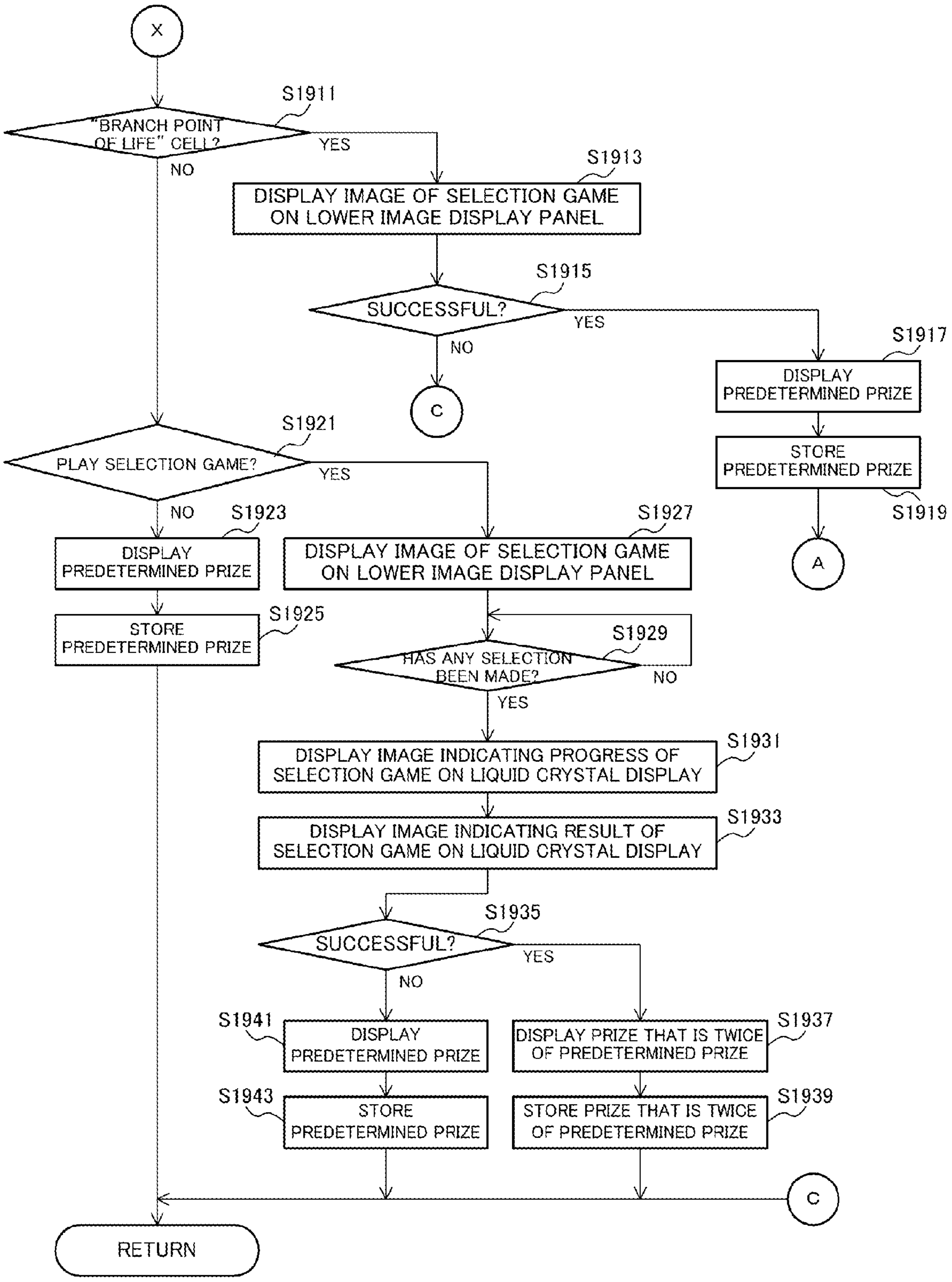
FIG. 19 is a flowchart showing processing subsequent to the subroutine of the prize determination processing of FIG. 18.

FIG. 18 and FIG. 19 are flowcharts each showing a subroutine of the prize determination processing to be invoked and executed in the processing operation of step S1629 of FIG. 16.

First, the main CPU 71 determines whether or not the piece has stopped in a prize cell (step S1811). The prize cell is a cell in which when the piece has stopped, a numeric value assigned to that cell is awarded to a player as the prize. When the CPU 71 determines that the piece has stopped in the prize cell (YES), the CPU 71 stores the numeric value assigned to the cell as a prize to be awarded to a player (step S1813) and then causes the routine to revert to the step S1615 described above.

When the main CPU 71 determines that the piece has not stopped in the prize cell (NO), the main CPU 71 determines whether or not the piece has stopped in a non-display prize cell (step S1815). When the main CPU 71 determines that the piece has stopped in the non-display prize cell (YES), the CPU 71 executes lottery processing and then determines an event (step S1817). The event includes a prize such as a first prize or a second prize in a lottery or the like, for example.

The main CPU 71 displays a numeric value that corresponds to the determined event on the upper image display panel 131 (step S1819); stores the numeric value that corresponds to the determined event as a prize to be awarded to a player (step S1821); and causes the routine to revert to the step S1615 described above. When the piece has stopped in a non-display prize cell, the contents of the cell are displayed on the upper image display panel 131, a predetermined event is executed, and then a prize corresponding to the event is awarded to a player. The contents of the cell are not displayed until the piece has stopped in the non-display prize cell, so that a player's sense of expectation can be enhanced.

When the main CPU 71 determines that the piece has not stopped in the non-display prize cell in the determination processing of step S1815 (NO), the main CPU 71 determines whether or not the piece has stopped in a "selection of life" cell (step S1823). When the main CPU 71 determines that the piece has stopped in the "selection of life" cell (YES), a player operates the touch panel 114, thereby displaying on the upper image display panel 131 a message indicating whether to select one option from among two options, i.e., an option of entering an employment or an option of going on to the next stage of education (step S1825) and then it is determined whether or not the option of entering an employment (step S1827).

When the option of entering an employment has not selected (NO), the main CPU 71 stores the fact that the option of going on to the next stage of education has been selected (step S1829) and then causes the routine to revert to the step S1615 described above. When the option of entering an employment has been selected (YES), the CPU 71 displays a predetermined prize that is assigned to the "selection of life" cell on the upper image display panel 131 (step S1831); stores the predetermined prize (step S1833); and then, causes the routine to revert to the step S1615 described above.

When the main CPU 71 determines that the piece has not stopped in the "selection of life" cell in the determination processing of the step S1823 described above (NO), the main CPU 71 determines whether or not the piece has stopped in a PAYDAY cell (step S1835). When the main CPU 71 determines that the piece has stopped in the PAYDAY cell (YES), the main CPU 71 determines whether or not the option of going on to the next stage of education has been selected in the processing operation of the "selection of life" cell described above (step S1837). Specifically, the CPU 71 determines whether or not the fact that the option of going on to the next stage of education has been selected is stored in accordance with the processing operation of the step S1829.

When, in the processing operation of the step S1837, the main CPU 71 determines that the option of going on to the next stage of education has been selected in the processing operation of the "selection of life" cell (YES), the CPU 71 displays a numeric value that is twice of an usual numeric value assigned to the PAYDAY cell, on the upper image display panel 131, as a prize to be awarded to a player (step S1839); stores the numeric value as a prize to be awarded to a player (step S1841); and then, causes the routine to revert to the step S1615 described above.

When, in the processing operation of the step S1837, the main CPU 71 determines that the option of going on to the next stage of education has not been selected in the processing operation of the "selection of life" cell (NO), the main CPU 71 displays the usual numeric value that is assigned to the PAYDAY cell, on the upper image display panel 131, as a prize to be awarded to a player (step S1843); stores the numeric value as the prize to be awarded to the player (step S1845); and then, causes the routine to revert to the step S1615 described above.

When the main CPU 71 determines that the piece has not stopped in the PAYDAY cell in the determination processing of the step S1835 described above (NO), the main CPU 71 determines whether or not the piece has stopped in a MINI GAME cell (step S1847).

When the main CPU 71 determines that the piece has stopped in the MINI game cell (YES), the main CPU 71 displays a selection game on the lower image display panel 141 (step S1849). In accordance with this processing operation, an image indicating a plurality of options is displayed on the lower image display panel 141.

Next, the main CPU 71 determines whether or not one option has been selected from among the plurality of options by a player operation (step S1851). The selection operation by the player may be an operation made by a device that can be operated by a player, such as the touch panel 114 or the spin button 31. When the main CPU 71 determines that the player has not selected any one option (NO), the main CPU 71 causes the routine to revert to step S1851.

Alternatively, when the main CPU 71 determines that the player has selected one option (YES), the main CPU 71 displays a numeric value that is assigned to the selected option on the upper image display panel 131 as a prize to be awarded to the player (step S1853); stores the numeric value as the prize to be awarded to the player (step S1855); and then, causes the routine to revert to the step S1615 described above.

When the main CPU 71 determines that the piece has not stopped in the MINI GAME cell in the determination processing of the step S1847 described above (NO), the main CPU 71 determines whether or not the piece has stopped in a "branch point of life" cell (step S1911). As described above, the "branch point of life" cell is a cell in which "WIN or LOSE" is displayed.

When the main CPU 71 determines that the piece has stopped in the "branch point of life" cell (YES), the main CPU 71 displays a two-option selection game on the lower image display panel 141 (step S1913). In accordance with this processing operation, an image indicating two options is displayed on the lower image display panel 141. One is an option corresponding to a success, and the other is an option corresponding to a failure.

Next, the main CPU 71 determines whether or not the option corresponding to a success has been selected from among the two options by means of a player operation (step S1915). The selection operation by this player may be an operation made by a device that can be operated by a player, such as the touch panel 114 or the spin button 31.

When the main CPU 71 determines that the option corresponding to a success has been selected (YES), the main CPU 71 displays a numeric value that is assigned to the option corresponding to a success on the upper image display panel 131 as a prize to be awarded to a player (step S1917); stores the numeric value as the prize to be awarded to the player (step S1919); and then, causes the routine to revert to the step S1615 described above.

When the main CPU 71 determines that the option corresponding to a success has not been selected in the processing operation of the step S1915 (NO), that is, when the CPU 71 determines that the option corresponding to a failure has been selected, the CPU 71 completes this subroutine immediately and then completes the game of life.

When the main CPU 71 determines that the piece has not stopped in the "branch point of life" cell in the determination processing of the step S1911 described above (NO), the main CPU 71 determines whether or not to play a selection game while assuming that the piece has stopped in a GOAL cell (step S1921). The selection game is a game in which there is a possibility that a further prize can be acquired. When the piece has stopped in the GOAL cell, it is possible for a player to first select whether or not to play the selection game. The selection operation by this player may be an operation made by a device that can be operated by a player, such as the touch panel 114 or the spin button 31.

When the main CPU 71 determines that no play of the selection game has been selected by a player operation (NO), the main CPU 71 displays a numeric value that is assigned to a GOAL cell on the upper image display panel 131 as a prize to be awarded to a player (step S1923); stores the numeric value as the prize to be awarded to the player (step S1925); completes this subroutine; and then, completes the game of life.

When the main CPU 71 determines that the play of the selection game has been selected by a player operation in the processing operation of the step S1921 (YES), the main CPU 71 displays an image indicating two options on the lower image display panel 141 (step S1927). One is an option corresponding to a success, and the other is an option corresponding to a failure. For example, this selection game is a roulette game.

Next, the main CPU 71 determines whether or not either one of the two options has been selected by a player operation (step S1929). When the main CPU 71 determines that neither of the two options has been selected (NO), the main CPU 71 causes the routine to revert to step S1929.

When the main CPU 71 determines that either one of the options has been selected (YES), the main CPU 71 displays a screen indicating the progress of the selection game on the upper image display panel 131 (step S1931). As described above, for example, this selection game is a roulette game. In step S1931, an image in a mode in which a roulette board rotates is displayed. On the roulette board, region corresponding to a success (red regions) and regions corresponding to a failure (black regions) are disposed alternately along a circumferential direction. The selection game is a game in which when rotation of the roulette board has stopped, if a ball enters one of the red regions, the result is obtained as a success, or alternatively, if the ball enters one of the black regions, the result is obtained as a failure.

The main CPU 71 displays a screen indicating a result of the selection game on the upper image display panel 131 after the processing operation of the step S1931 has been executed for a predetermined period of time (step S1933). For example, the upper image display panel 131 displays an image indicating that rotation of the roulette board stops and then a ball enters a red region or a black region.

Next, the main CPU 71 determines Whether or not the result is successful (step S1935). When the main CPU 71 determines that the result is successful (YES), the main CPU 71 displays a numeric value that is twice of a numeric value that is assigned to the GOAL cell on the upper image display panel 131 as a prize to be awarded to a player (step S1937); stores the numeric value as the prize to be awarded to the player (step S1939); completes this subroutine; and then, completes the game of life.

When the main CPU 71 determines that the result is not successful in the processing operation of the step S1935 (NO), that is, when the main CPU 71 determines that the result has failed, the CPU 71 displays a numeric value that is assigned to the GOAL cell on the upper image display panel 131 as a prize to be awarded to a player (step S1941); stores the numeric value as the prize to be awarded to the player (step S1943); completes this subroutine; and then, completes the game of life.

<<<Modification Example>>>

While, in the example described above, a case of illuminating the entire game panel 133 (twenty four cells C1 to C24) by means of the lamp 135 was shown, a plurality of lamps that correspond to the respective twenty four cells C1 to C24 may be provided so as to thereby indicate the movement of the piece in accordance with illumination states of these lamps.

At the rear of the game panel 133, a plurality of lamps 137-1 to 137-24 (not shown) are provided so as to correspond to the respective cells C1 to C24. The plurality of lamps 137-1 to 137-24 are made of LED lamps, as is the case with the lamp 135, each of which functions as a backlight of the game panel

133. For example, the cell C1 is provided so as to correspond to the lamp 137-1, and the cell C5 is provided so as to correspond to the lamp 137-5.

The plurality of lamps 137-1 to 137-24 are electrically connected to a main PCB 110 via a lamp drive circuit (not shown). By doing this, the illumination state of each of the plurality of lamps 137-1 to 137-24 can be individually controlled by means of the main CPU 71.

As described above, each of the lamps 137-1 to 137-24 is disposed at the rear of the corresponding cell. The corresponding cells are illuminated from their rear side by means of the lamps 137-1 to 137-24 under the control of the main CPU 71, whereby a cell in which the piece is currently positioned can be displayed in a bright mode. Alternatively, after the piece has moved to another cell, when the lamp turns off, a cell in which the piece has been originally positioned can be displayed in a dark mode.

For example, in the processing operation of the step S1613 described above, the main CPU 71 lights up the lamp that is disposed at the rear of the "START" cell C1 and displays an arrow-pointing indicator image for indicating the "START" cell on the upper image display panel 131. By doing this, the "START" cell in which the piece is currently positioned can be clearly indicated for a player by way of each of lamp illumination and the arrow-pointing indicator image.

Further, when the piece moves to anew cell, the piece may be displayed so as to move on a one-by-one cell basis until the piece has reached the new cell. Specifically, an illuminated lamp is turned off and a lamp of an adjacent cell in a forward direction of the piece is turned on for a predetermined period of time and then is caused to turn off. A lamp of a further adjacent cell is turned on for a predetermined period of time and then is turned off. Thus, turning on and turning off the lamps of the adjacent cells are sequentially repeated, whereby the adjacent cells can be displayed in a mode in which the piece sequentially moves along a route.

If a player touches a dice image that is displayed on the lower image display panel 141 by executing the processing operations described above, random numbers are generated and then an image of a rolled number of the dice according to the generated random numbers is determined referring to table data obtained when the rolled numbers 1 to 6 of the dice that is employed in a dice game and random numbers have been associated with each other. Then, the image of the determined rolled number of the dice is displayed at a center portion of the upper image display panel 131. After the image has been displayed, a control program is read out for the sake of sequential illumination control toward the goal cell of light sources that are disposed at a site on a rear side of a game panel 133 (an acrylic plate), the site being partitioned so as separates the each symbols of the cell (pieces) and not to illuminate a game panel 133 of the another cell (an acrylic plate portion). Then, by executing the control program, a display is executed in such a manner that an illumination position advances toward a goal in accordance with the rolled number of the dice.

While, in the example described above, the game of life was completed by executing the contents of a predetermined cell such as the "GOAL" cell, lottery processing may be executed by the number of times according to a predetermined number of games (the number of free games) so as to thereby determine the rolled number of the dice. In this case, the game of life is executed by the number of times according to the number of games and then control is executed in such a manner that the prize data that is stored to be associated with the cells to which the piece moves is increased or decreased until the number of games has completed.

What is claimed is:

1. A gaming machine comprising:

a first display on which a first game whose result is determined according to a symbol display mode is to be performed;

a second display that is different from the first display and is disposed on the first display;

an operating device configured to detect a player operation; and a controller for controlling the first display and the second display, the controller being programmed so as to execute processing operations of:

(1-1-1) displaying a piece on a cell corresponding to a current position; and (1-1-2) when a predetermined number or more of predetermined symbols are displayed on the first display as a result of the first game, repeatedly executing a second game until a predetermined completion condition is established, wherein executing the second game includes:

(1-1-3) displaying on the first display an image of dice or a die;

(1-1-4) determining a rolled number of the dice or die when the operating device detects the player operation in the first display;

(1-1-5) displaying on the first and second displays an image that the dice or die rolls and moves from the first display to the second display when the operating device detects the player operation in the first display;

(1-1-6) displaying on the second display an image that the dice or die is stopped and the rolled number is displayed on a front face of the dice or die;

(1-1-7) selecting a second cell corresponding to a new position of the piece from among a plurality of cells, by adding the rolled number to the current position; and (1-1-8) displaying the piece on the second cell corresponding to the new position, wherein the predetermined completion condition includes selecting a goal cell that is a goal point of the second game in the processing operation of (1-1-7), and the second game is repeatedly executed if the predetermined completion condition is not established.

2. The gaming machine according to claim 1, wherein determining the rolled number of the dice or die includes determining the rolled number of the dice or die by means of lottery processing.

3. The gaming machine according to claim 2, wherein the controller is configured to further execute a processing operation of (1-3-1) executing as the second game a game to be played by selecting the cell corresponding to the new position.

4. The gaming machine according to claim 3, wherein the controller is configured to further execute a processing operation of (1-4-1) executing a processing operation of storing a predetermined prize for a selected cell as a profit to be awarded to a player after executing the processing operation of (1-3-1).

5. The gaming machine according to claim 3, wherein the controller is configured to further execute processing operations of, when a goal cell included in the plurality of cells has not reached after executing the processing operation of (1-3-1), (1-5-1) displaying on the first display the image of the dice or die;

(1-5-2) executing the processing operations of (1-1-3) to (1-1-7).

6. The gaming machine according to claim 3, wherein the plurality of cells are disposed at a part of at least a periphery of the second display, and the controller is configured to execute a processing operation of (2-6-1) displaying an indicator image indicating one selected cell on the second display.

7. The gaming machine according to claim 6, wherein the controller is configured to further execute a processing operation of (2-7-1) displaying a rendering image that corresponds to one selected cell on the second display in addition to the processing operation of (2-6-1).

8. The gaming machine according to claim 3, wherein the controller is configured to further execute processing operations of:

(3-8-1) when a goal cell has been selected from among the plurality of cells, selecting one option from among a plurality of options in accordance with an operation of the operating device by a player; and (3-8-2) changing a predetermined prize for the goal cell in accordance with said one option that is selected by the player.

9. The gaming machine according to claim 8, wherein the processing operation of (3-8-2) is a processing operation of, when a first option has been selected from among a plurality of options, determining a prize that is more than a predetermined prize for the goal cell as a profit to be awarded to a player, or alternatively, when a second option that is different from the first option has been selected from among the plurality of options, determining the predetermined prize for the goal cell as a profit to be awarded to a player.

10. The gaming machine according to claim 3, wherein the controller is configured to further execute processing operations of:

when a non-display prize cell whose prize is not displayed has been selected from among the plurality of cells, determining an event by executing lottery processing; and awarding a numeric value corresponding to the determined event as a prize to the player.

11. The gaming machine according to claim 3, wherein the controller is configured to further execute processing operations of:

when a selection cell has been selected from among the plurality of cells, providing a plurality of options including a first option and a second option;

selecting one option from among the plurality of options in accordance with an operation of the operating device by the player; and when the first option is selected, awarding a numeric value corresponding to the first option as a prize to the player.

12. The gaming machine according to claim 11, wherein the controller is configured to further execute processing operations of:

when a specific cell has been selected from among the plurality of cells, awarding a numeric value corresponding to the specific cell as a prize to the player if the second option has not been selected in the selection cell; and when the specific cell has been selected from among the plurality of cells, awarding a numeric value that is greater than the numeric value corresponding to the specific cell as a prize to the player if the second option has been selected in the selection cell.

13. The gaming machine according to claim 3, wherein the controller is configured to further execute processing operations of:

when a branch cell has been selected from among the plurality of cells, providing a plurality of options including a first option and a second option;

selecting one option from among the plurality of options in accordance with an operation of the operating device by the player;

when the first option is selected, awarding a predetermined numeric value as a prize to the player; and when the second option is selected, ending the second game.

14. The gaming machine according to claim 1, wherein the first display has a touch panel, and wherein the player operation is a touch operation on the touch panel.

15. A gaming machine comprising:

a first display on which a first game whose result is determined according to a symbol display mode is to be performed;

a second display that is different from the first display;

an operating device configured to detect a player operation; and a controller for controlling the first display and the second display, the controller being programmed so as to execute processing operations of:

(1-1-1) when a predetermined number or more of predetermined symbols are displayed on the first display as a result of the first game, executing a second game that is different from the first game;

(1-1-2) outputting from the controller to the first display a first control signal for displaying on the first display an image that dice or a die rolls as triggered by detection of an operation of the operating device by a player, for determining progress of the second game;

(1-1-3) after a first predetermined period of time has elapsed after starting output of the first control signal, outputting from the controller to the second display a second control signal for display control to display an image that the dice or die rolls on the second display;

(1-1-4) completing output of the first control signal after a second predetermined period of time that is different from the first predetermined period of time has elapsed after starting output of the first control signal;

(1-1-5) executing as the second game a game to be played by selecting one cell from among a plurality of cells in accordance with a rolled number of the dice or die;

(1-1-6) when a goal cell that is a goal point of the second game has been selected from among the plurality of cells, displaying a plurality of goal options on at least one of the first and second displays, the goal point being a point for completing the second game;

(1-1-7) selecting one goal option from among the plurality of goal options in accordance with an operation of the operating device by the player; and (1-1-8) changing a predetermined prize for the goal cell in accordance with said one goal option that is selected by the player, wherein the second game is continued and the processing operations (1-1-2) to (1-1-5) are repeatedly executed if the goal cell is not selected in the processing operation of (1-1-5).

16. The gaming machine according to claim 15, wherein an image that the dice or die rolls and moves from the first display to the second display is displayed on the first and second displays by the first and second control signals.

* * * * *